(12) United States Patent
Yoshimoto et al.

(10) Patent No.: US 8,080,100 B2
(45) Date of Patent: Dec. 20, 2011

(54) TRISAZO COMPOUND, INK COMPOSITION, RECORDING METHOD AND COLORED BODY

(75) Inventors: Takashi Yoshimoto, Tokyo (JP); Yoshiaki Kawaida, Tokyo (JP); Takahiko Matsui, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/989,784

(22) PCT Filed: Apr. 28, 2009

(86) PCT No.: PCT/JP2009/058386
§ 371 (c)(1),
(2), (4) Date: Oct. 26, 2010

(87) PCT Pub. No.: WO2009/136575
PCT Pub. Date: Nov. 12, 2009

(65) Prior Publication Data
US 2011/0050787 A1 Mar. 3, 2011

(30) Foreign Application Priority Data
May 7, 2008 (JP) ................................. 2008-121557

(51) Int. Cl.
*C09D 11/02* (2006.01)
*C09B 31/16* (2006.01)

(52) U.S. Cl. ..................... 106/31.5; 106/31.48; 534/752; 534/755

(58) Field of Classification Search .................. 106/31.5, 106/31.48; 534/752, 755; 427/265; 347/100; 428/195.1
See application file for complete search history.

(56) References Cited

U.S. PATENT DOCUMENTS

| | | | |
|---|---|---|---|
| 4,012,371 A | 3/1977 | Roueche et al. | |
| 4,565,424 A | 1/1986 | Huffman et al. | |
| 4,668,050 A * | 5/1987 | Aoki et al. | 534/752 |
| 7,217,803 B2 * | 5/2007 | Feiler et al. | 534/752 |
| 7,550,037 B2 * | 6/2009 | Mafune et al. | 106/31.48 |
| 7,901,498 B2 * | 3/2011 | Hirota et al. | 106/31.5 |
| 2006/0053571 A1 * | 3/2006 | Feiler et al. | 8/512 |
| 2009/0011130 A1 | 1/2009 | Mafune et al. | |
| 2009/0062545 A1 | 3/2009 | Matsui et al. | |

FOREIGN PATENT DOCUMENTS

| | | |
|---|---|---|
| DE | 2004488 | 8/1971 |
| DE | 2023295 | 11/1971 |
| JP | S50-126716 | 10/1975 |
| JP | S58-120671 | 7/1983 |
| JP | H05-134435 | 5/1993 |
| JP | 2003-183545 | 7/2003 |
| JP | 2003-201412 | 7/2003 |
| JP | 2007-191641 | 8/2007 |
| JP | 2007-217082 | 8/2007 |
| JP | 2008-169374 | 7/2008 |
| JP | 2009-30023 | 2/2009 |
| WO | WO 2004/050768 | 6/2004 |
| WO | WO 2005/054374 | 6/2005 |
| WO | WO 2007/077931 | 7/2007 |
| WO | WO 2008/056626 | 5/2008 |
| WO | WO 2008/096697 | 8/2008 |

OTHER PUBLICATIONS

International Search Report issued in corresponding PCT Application No. PCT/JP2009/058386, mailed Jun. 2, 2009.

\* cited by examiner

*Primary Examiner* — Helene Klemanski
(74) *Attorney, Agent, or Firm* — Knobbe Martens Olson & Bear LLP

(57) ABSTRACT

Disclosed is a dye compound for black ink which has high solubility in media composed mainly of water and which is stable even when a high-concentration aqueous solution and ink are stored over a long term. The density of printed images is very high, and even if a high-concentration solution is used for printing, no bronzing occurs in the images, and black recorded images are provided with which all aspects of printed image durability, particularly light resistance and ozone gas resistance, are excellent. Also disclosed is an ink composition thereof. Trisazo compounds represented by general formula (1) or tautomers thereof or salts thereof are used as said dye compound for black ink.

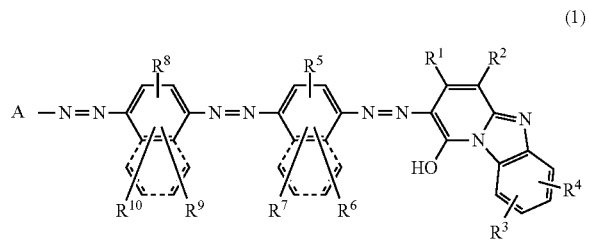

(1)

In formula (1), group A represents a 2-naphthothiazolyl group, $R^1$ represents a substitutable C1 to C4 alkyl group or the like, $R^2$ represents a cyano group or the like, $R^3$ and $R^4$ independently represent a hydrogen atom, a sulfo group, or the like, $R^5$ to $R^7$ independently represent a hydrogen atom, a substitutable C1 to C4 alkyl group, or a substitutable C1 to C4 alkoxy group, or the like, and $R^8$ to $R^{10}$ independently represent a hydrogen atom, a substitutable C1 to C4 alkyl group, a substitutable C1 to C4 alkxy group, a substitutable C1 to C4 alkylthio group, or the like.

16 Claims, No Drawings

TRISAZO COMPOUND, INK COMPOSITION, RECORDING METHOD AND COLORED BODY

This application is the U.S. National Phase under 35 U.S.C. §371 of International Application PCT/JP2009/058386, filed Apr. 28, 2009, designating the U.S., and published in Japanese as WO2009/136575 on Nov. 12, 2009, which claims priority to Japanese Patent Application No. 2008-121557, filed May 7, 2008.

TECHNICAL FIELD

The present invention relates to a novel trisazo compound or a salt thereof, an ink composition containing the compound or the salt thereof, and a colored body obtained with the compound or the salt thereof.

BACKGROUND ART

In a recording method by an ink jet printer, which is one typical method among a variety of color recording methods, recording is executed by generating ink droplets, and attaching the same to any of a variety of record-receiving materials (e.g., paper, film, and fabric, etc.). According to this method, a recording head is not brought into direct contact with the record-receiving material; therefore, generation of noise can be reduced thus achieving silent recording. In addition, due to having the features of a reduced size and an increased speed that can be readily achieved, prevalence in recent years has rapidly progressed, and great advancement hereafter is expected.

Aqueous inks containing a water soluble coloring matter dissolved in an aqueous medium have been used as conventional inks for fountain pens, felt pens etc., and inks for ink jet printing. Furthermore, to these aqueous inks is generally added a water soluble organic solvent in order to prevent pen tips or ink discharge nozzles from clogging with the ink. For these inks, demanded are abilities to generate a recorded image with satisfactory density, probability of avoiding occurrence of clogging at pen tips and nozzles, favorable drying characteristics on the record-receiving materials, suppression of bleeding, superior storage stability, and the like. Additionally, particularly high solubility in water, and high solubility in a water soluble organic solvent added to an ink are required for the water soluble coloring matter for use. Moreover, fastness such as water resistance, light resistance, gas resistance and moisture resistance has been required of the recorded image.

Of these, gas resistance means resistance to a phenomenon of causing discoloration of a printed image via an action of ozone gas or the like present in the air and having an oxidizing action on a coloring matter in the record-receiving material. In addition to the ozone gas, NOx, SOx, and the like are exemplified as the oxidizing gas having this type of action. However, among these oxidizing gases, ozone gas is considered to be the main causative substance that promotes the discoloration phenomenon of ink jet images. Therefore, particularly ozone gas resistance among resistance to gasses tends to attract the most importance. A material entity such as a porous white inorganic substance is often used in ink-receiving layers provided on the surface of photo image-quality exclusive ink jet paper in order to accelerate drying of the ink, and also to suppress bleeding of high quality images. Discoloration due to ozone gas is markedly found on such recording papers. Since this discoloration phenomenon resulting from oxidizing gas is characteristic in ink jet images, improvement of the ozone gas resistance is one of the most significant problems involved in ink jet printing methods.

Hence, in order to expand a field of application of printing methods in which an ink is used, further improvement of light resistance, ozone gas resistance, moisture resistance and water resistance is strongly demanded on ink compositions for use in ink jet printing and colored bodies obtained by coloring with the same.

Inks having a variety of hues are prepared from a variety of coloring matters, and black inks among them are important inks used in both mono color and full color images. Although many coloring matters have been proposed for use in black inks to date, products that meet market requirements have not yet been provided. Many of coloring matters proposed are azo coloring matters, and disazo coloring matters such as C. I. Food Black 2, etc., among these have problems of inferior color rendering properties, unfavorable water resistance and moisture resistance, as well as insufficient light resistance and gas resistance, and the like. With respect to polyazo coloring matters having an extended conjugated system, there are problems of generally low water solubility, a bronzing phenomenon likely to occur that provides a recorded image having metallic luster in part, as well as insufficient light resistance and gas resistance, and the like. In addition, in the case of azo-containing metal coloring matters proposed similarly in large numbers, some have favorable light resistance, but there exist problems of safety for living organisms, unfavorable environmental influences due to metal ions included, extremely inferior ozone gas resistance, and the like.

As the black coloring matter for ink jet having improved ozone gas resistance which has been the most significant problem in recent years, for example, compounds disclosed in Patent Documents 1 to 3 are exemplified. These compounds do not have ozone gas resistance that sufficiently meets market requirements, and the light resistance is also unsatisfactory. Furthermore, in regard to azo compounds having a benzimidazolopyrrolidone skeleton that is one characteristic feature of the trisazo compound of the present invention, descriptions are found in Patent Documents 4 to 7 and the like. Patent Documents 5 and 6 also disclose trisazo compounds, and these trisazo compounds have a symmetric structure provided by allowing both ends of a linking group including an azo structure to be further bound to two benzimidazolopyrrolidone skeletons via an azo structure; however, compounds similar to the asymmetric trisazo compound of the present invention are not disclosed. Additionally, Patent Documents 5 and 6 only disclose a small number of water soluble compounds and do not disclose any examples of use of black coloring matter as an ink jet ink. As an example of trisazo compounds for use in an ink jet ink having superior ozone gas resistance, a compound disclosed in Patent Document 8 is exemplified, which discloses that the compound can be used as a black coloring matter for use in a water soluble ink jet ink. Although these compounds have superior fastness, it tends to result in high chroma saturation for use in a black ink. Examples of black trisazo compounds for use in an ink jet ink having superior ozone gas resistance also include a compound disclosed in Patent Document 9; however, such compound has not sufficiently satisfied market requirements.

Patent Document 1: Japanese Unexamined Patent Application, Publication No. 2003-183545

Patent Document 2: Japanese Unexamined Patent Application, Publication No. 2003-201412

Patent Document 3: Japanese Unexamined Patent Application (translation of PCT Application), Publication No. 2007-517082

Patent Document 4: International Publication No. 2004/050768

Patent Document 5: West German Patent No. 2004488

Patent Document 6: West German Patent No. 2023295

Patent Document 7: Japanese Unexamined Patent Application, Publication No. H05-134435

Patent Document 8: International Publication No. 2007/077931

Patent Document 9: International Publication No. 2005/054374

Patent Document 10: East German Patent No. 223149

DISCLOSURE OF THE INVENTION

Problems to be Solved by the Invention

An object of the present invention is to provide a trisazo compound or a salt thereof used as a coloring matter in a black ink particularly suited for ink jet printing, an ink composition containing the compound or the salt thereof as a coloring matter, and a colored body obtained with the compound or the salt thereof.

Means for Solving the Problems

In order to solve the foregoing problems, the present inventors thoroughly investigated, and consequently found that a certain trisazo compound represented by the following formula (1) solves the problems described above. Thus, the present invention was completed.

Accordingly, a first aspect of the present invention provides a trisazo compound represented by the following formula (1) or a tautomer of the same, or a salt thereof,

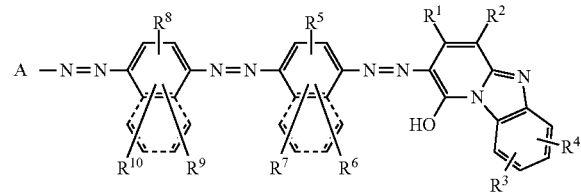

(1)

in the formula (1), $R^1$ represents a carboxy group; a C1-C4 alkyl group unsubstituted, or substituted with a carboxy group; or a phenyl group unsubstituted, or substituted with a sulfo group, $R^2$ represents a cyano group; a carbamoyl group; or a carboxy group, $R^3$ and $R^4$ each independently represent a hydrogen atom; a chlorine atom; a sulfo group; an unsubstituted C1-C4 alkyl group; or an unsubstituted C1-C4 alkoxy group, the ring having substitution with $R^5$ to $R^7$ is a benzene ring provided that the ring represented by the dotted line is not present; or a naphthalene ring provided that the ring represented by the dotted line is present, $R^5$ to $R^7$ each independently represent a hydrogen atom; a chlorine atom; a hydroxy group; a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group or a carboxy group; a mono- or di-C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; or a phenylsulfonylamino group unsubstituted, or substituted with a chlorine atom, an unsubstituted C1-C4 alkyl group, a nitro group, a sulfo group or a carboxy group on the benzene ring, the ring having substitution with $R^8$ to $R^{10}$ is a benzene ring provided that the ring represented by the dotted line is not present; or a naphthalene ring provided that the ring represented by the dotted line is present, $R^8$ to $R^{10}$ each independently represent a hydrogen atom; a chlorine atom; a hydroxy group; a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group or a carboxy group; a C1-C4 alkylthio group substituted with a hydroxy group, a sulfo group, or a carboxy group; a mono- or di- C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; or a phenylsulfonylamino group unsubstituted, or substituted with a chlorine atom, an unsubstituted C1-C4 alkyl group, a nitro group, a sulfo group or a carboxy group on the benzene ring, and the group A is a 2-naphthothiazolyl group unsubstituted or having a substituent, provided that the 2-naphthothiazolyl group has a substituent, the substituent may be selected from the group consisting of: a chlorine atom; a sulfo group; a nitro group; a hydroxy group; a sulfamoyl group; an unsubstituted C1-C4 alkyl group; a C1-C4 alkoxy group unsubstituted, or substituted with a hydroxy group, a C1-C4 alkoxy group, a sulfo group or a carboxy group; a C1-C4 alkylsulfonyl group unsubstituted, or substituted with a hydroxy group, a sulfo group or a carboxy group; and a phenylsulfonyl group unsubstituted, or substituted with a chlorine atom, an unsubstituted C1-C4 alkyl group, a nitro group, a sulfo group or a carboxy group on the benzene ring.

A second aspect of the present invention provides the trisazo compound or a tautomer of the same, or a salt thereof according to the first aspect, wherein the trisazo compound represented by the above formula (1) is represented by the following formula (2):

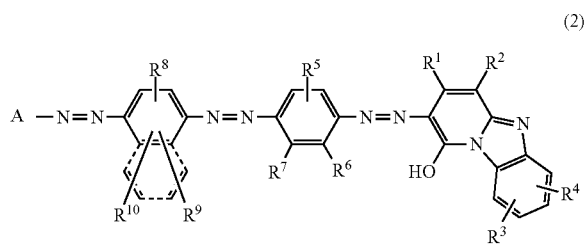

(2)

in the formula (2), the group A, $R^1$ to $R^{10}$, and the ring having substitution with $R^8$ to $R^{10}$ have the same meanings as those in the formula (1) including the ring represented by the dotted line.

A third aspect of the present invention provides the trisazo compound or a tautomer of the same, or a salt thereof according to the second aspect, wherein the trisazo compound represented by the above formula (1) is represented by the following formula (3):

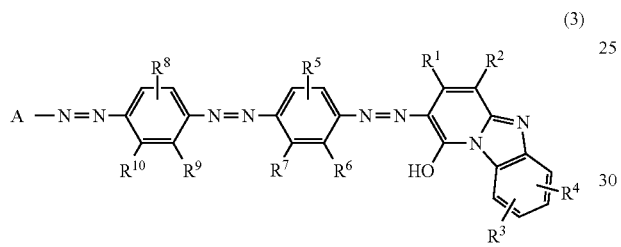

(3)

in the formula (3), the group A, and $R^1$ to $R^{10}$ have the same meanings as those in the formula (1).

A fourth aspect of the present invention provides the trisazo compound or a tautomer of the same, or a salt thereof according to the third aspect, wherein the trisazo compound represented by the above formula (1) is represented by the following formula (4):

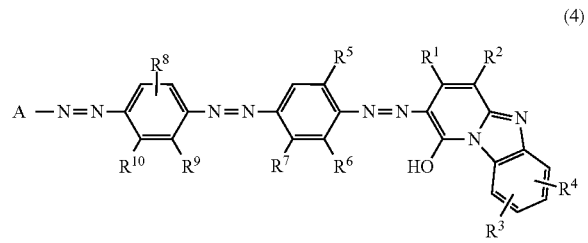

(4)

in the formula (4),
the group A, $R^1$ to $R^4$, and $R^8$ to $R^{10}$ have the same meanings as those in the formula (1),
$R^5$ and $R^7$ each independently represent a hydrogen atom; a chlorine atom; a C1-C4 alkylcarbonylamino group unsubstituted, or substituted with a hydroxy group or a carboxy group; an unsubstituted C1-C4 alkyl group; or a C1-C4 alkoxy group unsubstituted, or substituted with a sulfo group or a hydroxy group, and $R^6$ represents a hydrogen atom.

A fifth aspect of the present invention provides the trisazo compound or a tautomer of the same, or a salt thereof according to the fourth aspect, wherein the trisazo compound represented by the above formula (1) is represented by the following formula (5):

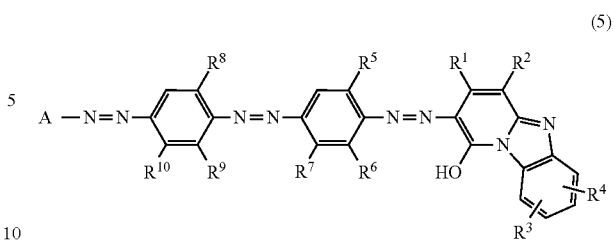

(5)

in the formula (5),
the group A, and $R^1$ to $R^4$ have the same meanings as those in the formula (1),
$R^5$ to $R^7$ have the same meanings as those in the formula (4),
$R^8$ and $R^{10}$ each independently represent a hydrogen atom; a chlorine atom; a C1-C4 alkylcarbonylamino group unsubstituted, or substituted with a hydroxy group or a carboxy group; a sulfo C1-C4 alkoxy group; an unsubstituted C1-C4 alkyl group; a C1-C4 alkoxy group unsubstituted, or substituted with a sulfo group; or a C1-C4 alkylthio group substituted with a sulfo group or a carboxy group, and $R^9$ represents a hydrogen atom.

A sixth aspect of the present invention provides the trisazo compound or a tautomer of the same, or a salt thereof according to the first aspect, wherein the group A is a group represented by the following formula (6):

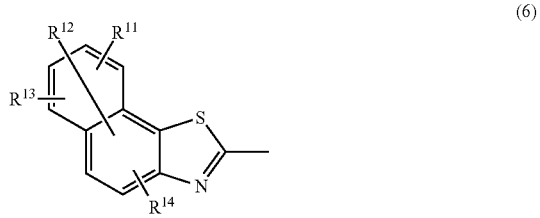

(6)

in the formula (6),
$R^{11}$ to $R^{14}$ each independently represent a group selected from the group consisting of a hydrogen atom; a chlorine atom; a sulfo group; a nitro group; a hydroxy group; a sulfamoyl group; a C1-C4 alkoxy group unsubstituted, or substituted with a hydroxy group, an unsubstituted C1-C4 alkoxy group, a sulfo group or a carboxy group; and a C1-C4 alkylsulfonyl group unsubstituted, or substituted with a hydroxy group, a sulfo group or a carboxy group.

A seventh aspect of the present invention provides the trisazo compound or a tautomer of the same, or a salt thereof according to the first aspect, wherein: $R^1$ is a methyl group; $R^2$ is a cyano group or a carbamoyl group; $R^3$ is a hydrogen atom; and $R^4$ is a sulfo group.

An eighth aspect of the present invention provides the trisazo compound or a tautomer of the same, or a salt thereof according to the first aspect, wherein: $R^5$ is a sulfopropoxy group or a sulfobutoxy group; $R^6$ is a hydrogen atom; and $R^7$ is a hydrogen atom, a chlorine atom, an acetylamino group, a methyl group or an ethyl group, a methoxy group or an ethoxy group, or a sulfopropoxy group or a sulfobutoxy group.

A ninth aspect of the present invention provides the trisazo compound or a tautomer of the same, or a salt thereof according to the first aspect, wherein: $R^8$ is a sulfopropylthio group or sulfobutylthio group; $R^9$ is a hydrogen atom; and $R^{10}$ is a hydrogen atom, a chlorine atom, an acetylamino group, a methyl group or an ethyl group, a methoxy group or an ethoxy group, or a sulfopropoxy group.

A tenth aspect of the present invention provides the trisazo compound or a tautomer of the same, or a salt thereof according to the sixth aspect, wherein: $R^1$ is a methyl group; $R^2$ is a cyano group; $R^3$ is a hydrogen atom; $R^4$ is a sulfo group; $R^5$ is a sulfopropoxy group; $R^6$ is a hydrogen atom; $R^7$ is a methyl group, a methoxy group, a chlorine atom or an acetylamino group; $R^8$ is a sulfopropylthio group; $R^9$ is a hydrogen atom; $R^{10}$ is a methyl group, a methoxy group, a chlorine atom or an acetylamino group; and three among $R^{11}$ to $R^{14}$ are a sulfo group, and the remaining one thereof is a hydrogen atom.

An eleventh aspect of the present invention provides an ink composition containing as a coloring matter at least one of the trisazo compound or a tautomer of the same, or a salt thereof according to the first aspect.

A twelfth aspect of the present invention provides an ink jet printing method including printing using as an ink the ink composition according to the eleventh aspect by discharging ink droplets of the ink in response to recording signals to attach on a record-receiving material.

A thirteenth aspect of the present invention provides the ink jet printing method according to the twelfth aspect, wherein the record-receiving material in the ink jet printing method is a communication sheet.

A fourteenth aspect of the present invention provides the ink jet printing method according to the thirteenth aspect, wherein the communication sheet is a sheet having an ink-receiving layer containing a porous white inorganic substance.

A fifteenth aspect of the present invention provides an ink jet printer equipped with a vessel containing the ink composition according to the eleventh aspect.

A sixteenth aspect of the present invention provides a colored body which was colored with the trisazo compound or a tautomer of the same, or a salt thereof according to the first aspect.

Effects of the Invention

The trisazo compound or a tautomer of the same, or a salt thereof of the present invention is characterized by: being highly soluble in media constituted mainly with water and being stable even when a high-concentration aqueous solution or ink of the compound is stored for a long period of time, and capable of providing printed images having very high print density, as well as being readily synthesizable and inexpensive, and the like.

Since the trisazo compound or a tautomer of the same, or a salt thereof of the present invention is superior in water solubility, filterability in the step of producing an ink composition on membrane filters is favorable, and superior discharge stability and storage stability of the ink composition containing the compound or the ink prepared from the ink composition are attained. In other words, the ink composition of the present invention containing the trisazo compound or a tautomer of the same, or a salt thereof exhibits favorable storage stability, without being accompanied by solid deposition, physical property alteration, color change and the like after storage for a long period of time. In addition, the ink composition containing the trisazo compound or a tautomer of the same, or a salt thereof of the present invention is suitably used for ink jet printing and for use in writing tools, and when used for recording on plain paper and exclusive ink jet paper, the print density of the recorded image becomes very high but bronzing does not occur on the image even if printed with a high-concentration solution, and various types of superior fastness, particularly both favorable light resistance and ozone gas resistance are attained. By using in combination with other ink compositions each containing magenta, cyan, and yellow coloring matters, full-color ink jet printing that is superior in various types of fastness and also superior in storability is enabled. Accordingly, the ink composition of the present invention is extremely useful as a black ink for ink jet printing.

PREFERRED MODE FOR CARRYING OUT THE INVENTION

The present invention is explained in detail below.

The trisazo compound or a tautomer of the same, or a salt thereof of the present invention is a black coloring matter. In the following description, "the trisazo compound or a tautomer of the same, or a salt thereof of the present invention" is inclusively referred to expediently as merely "the trisazo compound of the present invention", in brief.

The trisazo compound represented by the above formula (1) has tautomers, and examples of the tautomer are conceived to include in addition to the compound represented by the formula (1), those represented by the following formulae (7) and (8), and the like. These tautomers are also included in the present invention. It is to be noted that in the following formulae (7) and (8), the group A, and the rings having substitution with $R^1$ to $R^{10}$ have the same meanings as in the above formula (1) including the ring represented by the dotted line.

(7)

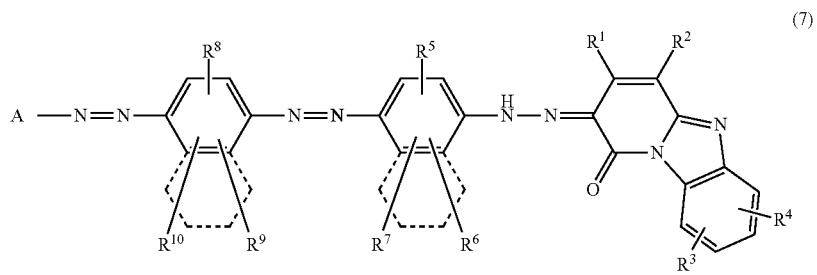

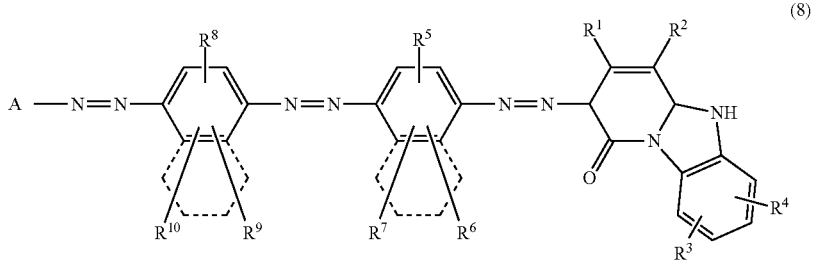

(8)

In the above formula (1), $R^1$ represents a carboxy group; a C1-C4 alkyl group unsubstituted, or substituted with a carboxy group; or a phenyl group unsubstituted, or substituted with a sulfo group.

When $R^1$ in the formula (1) is an unsubstituted C1-C4 alkyl group, the alkyl group may be either straight or branched alkyl group, but straight alkyl groups are preferred. Specific examples of the unsubstituted C1-C4 alkyl group include, for example, straight alkyl groups such as methyl, ethyl, n-propyl and n-butyl; and branched alkyl groups such as isopropyl, isobutyl, sec-butyl and tert-butyl.

Also when the C1-C4 alkyl group has a carboxy group, the alkyl moiety may be the same as one described above including preferable options etc.

When $R^1$ is a C1-C4 alkyl group substituted with a carboxy group, specific preferable examples include carboxymethyl, 2-carboxyethyl, 3-carboxypropyl, and the like.

Specific examples of $R^1$ in the formula (1) when it is a phenyl group unsubstituted, or substituted with a sulfo group include, for example, unsubstituted phenyl, as well as sulfo-substituted phenyl etc., substituted with usually 1 to 4, preferably 1 to 3, and more preferably 1 to 2 sulfo groups such as 2-sulfophenyl, 4-sulfophenyl, 2,4-disulfophenyl, 3,5-disulfophenyl, and the like.

$R^1$ in the above formula (1) is more preferably an unsubstituted C1-C4 alkyl group, or an unsubstituted phenyl group, and particularly preferably an unsubstituted C1-C4 alkyl group among those in the foregoing.

Specific examples of $R^1$ in the formula (1) include methyl, ethyl, n-propyl, tert-butyl and phenyl, more preferably methyl, n-propyl and phenyl, and still more preferably methyl.

In the above formula (1), $R^2$ represents a cyano group; a carbamoyl group; or a carboxy group. Any one of $R^2$ is preferred, but cyano or carbamoyl is more preferred, and cyano is still more preferred.

In preferable combinations of $R^1$ and $R^2$ in the formula (1), $R^1$ is methyl and $R^2$ is cyano, or $R^1$ is methyl and $R^2$ is carbamoyl. The former combination is more preferred.

In the above formula (1), $R^3$ and $R^4$ each independently represent a hydrogen atom; a chlorine atom; a sulfo group; an unsubstituted C1-C4 alkyl group; or an unsubstituted C1-C4 alkoxy group.

When $R^3$ and $R^4$ in the formula (1) are an unsubstituted C1-C4 alkyl group, the alkyl group may be the same as one described above in connection with the case of $R^1$ being an unsubstituted C1-C4 alkyl group, including preferable options etc.

When $R^3$ and $R^4$ in the formula (1) are an unsubstituted C1-C4 alkoxy group, both straight and branched alkoxy C1-C4 alkoxy group, are preferred as the alkyl group. Specific examples include methoxy, ethoxy, n-propoxy, isopropoxy, n-butoxy, sec-butoxy, tert-butoxy, and the like.

$R^3$ and $R^4$ in the above formula (1) are more preferably a hydrogen atom; a sulfo group; or an unsubstituted C1-C4 alkyl group among those described above.

Specific examples of preferable $R^3$ and $R^4$ in the formula (1) include a hydrogen atom, sulfo, methyl, ethyl, n-propyl, isopropyl and tert-butyl, more preferably a hydrogen atom, sulfo, methyl and isopropyl, and still more preferably a hydrogen atom and sulfo.

Particularly preferable $R^3$ and $R^4$ in the formula (1) are a hydrogen atom, methyl, or sulfo. In addition, in preferable combinations of $R^3$ and $R^4$, $R^3$ is a hydrogen atom and $R^4$ is sulfo, or $R^3$ is sulfo and $R^4$ is a hydrogen atom. The former combination is more preferred.

In the above formula (1), the ring having substitution with $R^5$ to $R^7$ represents a benzene ring provided that the ring represented by the dotted line is not present; or a naphthalene ring provided that the ring represented by the dotted line is present. It is preferred that the ring represented by the dotted line is not present, i.e., the ring having substitution with $R^5$ to $R^7$ is a benzene ring.

$R^5$ to $R^7$ each independently represent a group selected from the group consisting of: a hydrogen atom; a chlorine atom; a hydroxy group; a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group or a carboxy group; a mono- or di-C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; and a phenylsulfonylamino group unsubstituted, or substituted with a chlorine atom, an unsubstituted C1-C4 alkyl group, a nitro group, a sulfo group or a carboxy group on the benzene ring.

When $R^5$ to $R^7$ are an unsubstituted C1-C4 alkyl group, the alkyl group may be either straight or branched alkyl group, but straight alkyl groups are preferred. Specific examples of the unsubstituted C1-C4 alkyl group include, for example, straight alkyl groups such as methyl, ethyl, n-propyl and n-butyl; and branched alkyl groups such as isopropyl, isobutyl, sec-butyl and tert-butyl. More specifically, the alkyl group is preferably methyl or ethyl, and more preferably methyl.

When $R^5$ to $R^7$ in the formula (1) are an unsubstituted C1-C4 alkoxy group, the alkoxy group may be the same as one described above in connection with the case of $R^3$ and $R^4$ being an unsubstituted C1-C4 alkoxy group, including preferable options.

When the alkoxy group is substituted with a hydroxy group, an unsubstituted C1-C4 alkoxy group, a hydroxy C1-C4 alkoxy group, a sulfo group or a carboxy group, specific examples thereof include, for example, hydroxy C1-C4 alkoxy groups such as 2-hydroxyethoxy, 2-hydroxypropoxy and 3-hydroxypropoxy; unsubstituted C1-C4 alkoxy C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; hydroxy C1-C4 alkoxy C1-C4 alkoxy groups such as 2-hydroxyethoxyethoxy; sulfo C1-C4 alkoxy groups such as 3-sulfopropoxy and 4-sulfobutoxy; carboxy C1-C4 alkoxy groups such as carboxymethoxy, 2-carboxyethoxy and 3-carboxypropoxy; and the like.

When $R^5$ to $R^7$ in the formula (1) are an unsubstituted mono- or di-C1-C4 alkylamino group, both straight and branched moieties are preferred as the C1-C4 alkyl moiety. Specific examples thereof include straight moieties such as methylamino, ethylamino, n-propylamino, isopropylamino, n-butylamino, dimethylamino, diethylamino, di-n-propylamino and di-n-butylamino; branched moieties such as sec-butylamino, tert-butylamino and diisopropylamino; and the like.

When the mono- or di-C1-C4 alkylamino group is substituted with a hydroxy group, a sulfo group or a carboxy group, specific examples thereof include, for example, hydroxy-substituted mono- or di-C1-C4 alkylamino groups such as 2-hydroxyethylamino, 2-hydroxypropylamino and 2,2'-dihydroxydiethylamino; sulfo-substituted mono- or di-C1-C4 alkylamino groups such as 2-sulfoethylamino, 3-sulfopropylamino, 4-sulfobutylamino and 3,3'-disulfodipropylamino; carboxy-substituted mono- or di-C1-C4 alkylamino groups such as carboxymethylamino, 2-carboxyethylamino, 3-carboxypropylamino and 2,2'-dicarboxydiethylamino; and the like.

When $R^5$ to $R^7$ in the formula (1) are an unsubstituted C1-C4 alkylcarbonylamino group, the C1-C4 alkyl moiety may be either a straight or branched moiety, but straight alkyl moieties are preferred. Specific examples include acetylamino, propanoylamino, butanoylamino, and the like.

When the C1-C4 alkylcarbonylamino group is substituted with a hydroxy group or a carboxy group, specific examples of the C1-C4 alkylcarbonylamino group include, for example, hydroxy C1-C4 alkylcarbonylamino groups such as hydroxyethanoylamino, 2-hydroxypropanoylamino and 4-hydroxybutanoylamino; carboxy C1-C4 alkylcarbonylamino groups such as 3-carboxypropanoylamino; and the like.

When $R^5$ to $R^7$ in the formula (1) are an N'—C1-C4 alkylureide group, those having a substituent are more preferred than unsubstituted ones.

When the N'—C1-C4 alkylureide group is substituted with a hydroxy group, a sulfo group or a carboxy group, specific examples thereof include, for example, N'-hydroxy C1-C4 alkylureide groups such as N'-2-hydroxyethylureide and N'-3-hydroxyethylureide; N'-sulfo C1-C4 alkylureide groups such as N'-2-sulfoethylureide and N'-3-sulfopropylureide; N'-carboxy C1-C4 alkylureide groups such as N'-carboxymethylureide, N'-2-carboxyethylureide, N'-3-carboxypropylureide and N'-4-carboxybutylureide; and the like.

When $R^5$ to $R^7$ in the formula (1) are as described sequentially below a phenylamino group, a benzoylamino group, or a phenylsulfonylamino group each having a substituent, and the substituent of the benzene ring included in each group is a C1-C4 alkyl group, the alkyl group may be any one of straight, branched and cyclic alkyl groups, and straight and branched alkyl groups are preferred. Specific examples include, for example, straight alkyl groups such as methyl, ethyl, n-propyl and n-butyl; branched alkyl groups such as isopropyl, isobutyl, sec-butyl and tert-butyl.

When $R^5$ to $R^7$ in the formula (1) are a phenylamino group unsubstituted, or substituted with a chlorine atom, an unsubstituted C1-C4 alkyl group, a nitro group, a sulfo group or a carboxy group on the benzene ring, specific examples thereof include, for example, unsubstituted phenylamino, as well as chlorine atom-substituted phenylamino groups such as 2-chlorophenylamino, 4-chlorophenylamino and 2,4-dichlorophenylamino; unsubstituted C1-C4 alkyl-substituted phenylamino groups such as 2-methylphenylamino, 4-methylphenylamino and 4-tert-butylphenylamino; nitro-substituted phenylamino groups such as 2-nitrophenylamino and 4-nitrophenylamino; sulfo-substituted phenylamino groups such as 3-sulfophenylamino, 4-sulfophenylamino, 2,4-disulfophenylamino and 3,5-disulfophenylamino; carboxy-substituted phenylamino groups such as 2-carboxyphenylamino, 4-carboxyphenylamino, 2,5-dicarboxyphenylamino and 3,5-dicarboxyphenylamino; and the like.

When $R^5$ to $R^7$ in the formula (1) are a benzoylamino group unsubstituted, or substituted with a chlorine atom, an unsubstituted C1-C4 alkyl group, a nitro group, a sulfo group or a carboxy group on the benzene ring, specific examples thereof include, for example, unsubstituted benzoylamino, as well as chlorine atom-substituted benzoylamino groups such as 2-chlorobenzoylamino, 4-chlorobenzoylamino and 2,4-dichlorophenylamino; unsubstituted C1-C4 alkyl-substituted benzoylamino groups such as 2-methylbenzoylamino, 3-methylbenzoylamino and 4-methylbenzoylamino; nitro-substituted benzoylamino groups such as 2-nitrobenzoylamino, 4-nitrobenzoylamino and 3,5-dinitrobenzoylamino; sulfo-substituted benzoylamino groups such as 2-sulfobenzoylamino and 4-sulfobenzoylamino; carboxy-substituted benzoylamino groups such as 2-carboxybenzoylamino, 4-carboxybenzoylamino and 3,5-dicarboxybenzoylamino; and the like.

When $R^5$ to $R^7$ in the formula (1) are a phenylsulfonylamino group unsubstituted, or substituted with a chlorine atom, an unsubstituted C1-C4 alkyl group, a nitro group, a sulfo group or a carboxy group on the benzene ring, specific examples thereof include, for example, unsubstituted phenylsulfonylamino, as well as chlorine atom-substituted phenylsulfonylamino groups such as 2-chlorophenylsulfonylamino and 4-chlorophenylsulfonylamino; unsubstituted C1-C4 alkyl-substituted phenylsulfonylamino groups such as 2-methylphenylsulfonylamino, 4-methylphenylsulfonylamino and 4-tert-butylphenylsulfonylamino; nitro-substituted phenylsulfonylamino groups such as 2-nitrophenylsulfonylamino, 3-nitrophenylsulfonylamino and 4-nitrophenylsulfonylamino; sulfo-substituted phenylsulfonylamino groups such as 3-sulfophenylsulfonylamino and 4-sulfophenylsulfonylamino; carboxy-substituted phenylsulfonylamino groups such as 3-carboxyphenylsulfonylamino and 4-carboxyphenylsulfonylamino; and the like.

Specific examples of preferable $R^5$ to $R^7$ in the formula (1) include a hydrogen atom, carboxy, sulfo, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylamino, ethylamino, 2-hydroxyethylamino, 2-sulfoethylamino, 3-sulfopropylamino, 2-carboxyethylamino, dimethylamino, diethylamino, 2,2'-dihydroxydiethylamino, 2,2'-dicarboxydiethylamino, 3,3'-disulfodipropylamino, acetylamino, 3-carboxypropanoylamino, 4-hydroxybutanoylamino, N'-carboxymethylureide, N'-2-sulfoethylureide, 4-sulfophenylamino, 2,4-disulfophenylamino, 2,5-dicarboxyphenylamino, benzoylamino, 3-sulfobenzoylamino, 2-carboxybenzoylamino, phenylsulfonylamino, 4-methylphenylsulfonylamino, 4-nitrophenylsulfonylamino, 3-sulfophenylsulfonylamino, 4-carboxyphenylsulfonylamino and the like, more preferably, a hydrogen atom, sulfo, methyl, methoxy, 2-hydroxyethoxy, 2-sulfoethoxy, 3-sulfopropoxy, 4-sulfobutoxy, dimethylamino, 3,3'-disulfodipropylamino, acetylamino, 3-carboxypropanoylamino, N'-2-sulfoethylureide, 2,4-disulfophenylamino, benzoylamino, and 4-methylphenylsulfonylamino, and still more preferably, a hydrogen atom, sulfo, methyl, methoxy and 3-sulfopropoxy.

In preferable combinations of $R^5$ to $R^7$ in the formula (1), $R^5$ is sulfopropoxy or sulfobutoxy, and preferably 3-sulfopropoxy or 4-sulfobutoxy; $R^6$ is a hydrogen atom; and $R^7$ is a hydrogen atom, a chlorine atom, acetylamino, methyl or ethyl, methoxy or ethoxy, or sulfopropoxy or sulfobutoxy. Moreover, in further preferable combinations of $R^5$ to $R^7$; $R^5$ is sulfopropoxy; $R^6$ is a hydrogen atom; and $R^7$ is methyl, methoxy, a chlorine atom, or acetylamino.

In the above formula (1), the ring having substitution with $R^8$ to $R^{10}$ represents: a benzene ring provided that the ring represented by the dotted line is not present; or a naphthalene ring provided that the ring represented by the dotted line is present. It is preferred that the ring represented by the dotted line is not present, in other words, the ring having substitution with $R^8$ to $R^{10}$ is a benzene ring.

$R^8$ to $R^{10}$ each independently represent a group selected from the group consisting of hydrogen atom; a chlorine atom; a hydroxy group; a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group, or a carboxy group; a C1-C4 alkylthio group substituted with a hydroxy group, a sulfo group, or a carboxy group; a mono- or di-C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; and a phenylsulfonylamino group unsubstituted, or substituted with a chlorine atom, an unsubstituted C1-C4 alkyl group, a nitro group, a sulfo group or a carboxy group on the benzene ring.

When $R^8$ to $R^{10}$ are an unsubstituted C1-C4 alkyl group, the alkyl group may be either straight or branched alkyl group, but straight alkyl groups are preferred. Specific examples of the unsubstituted C1-C4 alkyl group include, for example, straight alkyl groups such as methyl, ethyl, n-propyl and n-butyl; branched alkyl groups such as isopropyl, isobutyl, sec-butyl and tert-butyl. More specifically, the alkyl group is preferably methyl or ethyl, and more preferably methyl.

When $R^8$ to $R^{10}$ in the formula (1) are an unsubstituted C1-C4 alkoxy group, the alkoxy group may be the same as one described above in connection with the case of $R^3$ and $R^4$ being an unsubstituted C1-C4 alkoxy group, including preferable options.

When the alkoxy group is substituted with a hydroxy group, an unsubstituted C1-C4 alkoxy group, a hydroxy C1-C4 alkoxy group, a sulfo group or a carboxy group, specific examples thereof include, for example, hydroxy C1-C4 alkoxy groups such as 2-hydroxyethoxy, 2-hydroxypropoxy and 3-hydroxypropoxy; unsubstituted C1-C4 alkoxy C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; hydroxy C1-C4 alkoxy C1-C4 alkoxy groups such as 2-hydroxyethoxyethoxy; sulfo C1-C4 alkoxy groups such as 3-sulfopropoxy and 4-sulfobutoxy; carboxy C1-C4 alkoxy groups such as carboxymethoxy, 2-carboxyethoxy and 3-carboxypropoxy; and the like.

When $R^8$ to $R^{10}$ in the formula (1) are an unsubstituted C1-C4 alkylthio group, both straight and branched moieties are preferred as the C1-C4 alkyl moiety. Specific examples thereof include straight moieties such as methylthio, ethylthio, n-propylthio, isopropylthio, n-butylthio, dimethylthio, diethylthio, di-n-propylthio and di-n-butylthio; branched moieties such as sec-butylthio, tert-butylthio and diisopropyl thio; and the like.

When the C1-C4 alkylthio group is substituted with a hydroxy group, a sulfo group or a carboxy group, specific examples thereof include, for example, hydroxy-substituted mono- or di-C1-C4 alkylthio groups such as 2-hydroxyethylthio, 2-hydroxypropylthio and 2,2'-dihydroxydiethylthio; sulfo-substituted mono- or di-C1-C4 alkylthio groups such as 2-sulfoethylthio, 3-sulfopropylthio, 4-sulfobutylthio and 3,3'-disulfodipropylthio; carboxy-substituted mono- or di-C1-C4 alkylthio groups such as carboxymethylthio, 2-carboxyethylthio, 3-carboxypropylthio and 2,2'-dicarboxydiethylthio; and the like.

When $R^8$ to $R^{10}$ in the formula (1) are an unsubstituted mono- or di-C1-C4 alkylamino group, both straight and branched moieties are preferred as the C1-C4 alkyl moiety. Specific examples thereof include, straight moieties such as methylamino, ethylamino, n-propylamino, isopropylamino, n-butylamino, dimethylamino, diethylamino, di-n-propylamino and di-n-butylamino; branched moieties such as sec-butylamino, tert-butylamino and diisopropylamino; and the like.

When the mono- or di- C1-C4 alkylamino group is substituted with a hydroxy group, a sulfo group or a carboxy group, specific examples thereof include, for example, hydroxy-substituted mono- or di- C1-C4 alkylamino groups such as 2-hydroxyethylamino, 2-hydroxypropylamino and 2,2'-dihydroxydiethylamino; sulfo-substituted mono- or di-C1-C4 alkylamino groups such as 2-sulfoethylamino, 3-sulfopropylamino, 4-sulfobutylamino and 3,3'-disulfodipropylamino; carboxy-substituted mono- or di- C1-C4 alkylamino groups such as carboxymethylamino, 2-carboxyethylamino, 3-carboxypropylamino and 2,2'-dicarboxydiethylamino; and the like.

When $R^8$ to $R^{10}$ in the formula (1) are an unsubstituted C1-C4 alkylcarbonylamino group, the C1-C4 alkyl moiety may be either straight or branched moiety, but straight alkyl moieties are preferred. Specific examples include acetylamino, propanoylamino, butanoylamino, and the like.

When the C1-C4 alkylcarbonylamino group is substituted with a hydroxy group or a carboxy group, specific examples of the C1-C4 alkylcarbonylamino group include, for example, hydroxy C1-C4 alkylcarbonylamino groups such as hydroxyethanoylamino, 2-hydroxypropanoylamino and 4-hydroxybutanoylamino; carboxy C1-C4 alkylcarbonylamino groups such as 3-carboxypropanoylamino; and the like.

When $R^8$ to $R^{10}$ in the formula (1) are an N'—C1-C4 alkylureide group, those having a substituent are more preferred than unsubstituted ones.

When the N'—C1-C4 alkylureide group is substituted with a hydroxy group, a sulfo group or a carboxy group, specific examples thereof include, for example, N'-hydroxy C1-C4 alkylureide groups such as N'-2-hydroxyethylureide and N'-3-hydroxyethylureide; N'-sulfo C1-C4 alkylureide groups such as N'-2-sulfoethylureide and N'-3-sulfopropylureide; N'-carboxy C1-C4 alkylureide groups such as N'-carboxymethylureide, N'-2-carboxyethylureide, N'-3-carboxypropylureide and N'-4-carboxybutylureide; and the like.

When $R^8$ to $R^{10}$ in the formula (1) are as described sequentially below a phenylamino group, a benzoylamino group, or a phenylsulfonylamino group each having a substituent, and the substituent of the benzene ring included in each group is a C1-C4 alkyl group, the alkyl group may be any one of straight, branched and cyclic alkyl groups, and straight and branched alkyl groups are preferred. Specific examples include, for example, straight alkyl groups such as methyl, ethyl, n-propyl and n-butyl; branched alkyl groups such as isopropyl, isobutyl, sec-butyl and tert-butyl.

When $R^8$ to $R^{10}$ in the formula (1) are a phenylamino group unsubstituted, or substituted with a chlorine atom, an unsubstituted C1-C4 alkyl group, a nitro group, a sulfo group or a carboxy group on the benzene ring, specific examples thereof include, for example, unsubstituted phenylamino, as well as chlorine atom-substituted phenylamino groups such as 2-chlorophenylamino, 4-chlorophenylamino and 2,4-dichlorophenylamino; unsubstituted C1-C4 alkyl-substituted phenylamino groups such as 2-methylphenylamino, 4-methylphenylamino and 4-tert-butylphenylamino; nitro-substituted phenylamino groups such as 2-nitrophenylamino and 4-nitrophenylamino; sulfo-substituted phenylamino groups such as 3-sulfophenylamino, 4-sulfophenylamino, 2,4-disulfophenylamino and 3,5-disulfophenylamino; carboxy-substituted phenylamino groups such as 2-carboxyphenylamino, 4-carboxyphenylamino, 2,5-dicarboxyphenylamino and 3,5-dicarboxyphenylamino; and the like.

When $R^8$ to $R^{10}$ in the formula (1) are a benzoylamino group unsubstituted, or substituted with a chlorine atom, an unsubstituted C1-C4 alkyl group, a nitro group, a sulfo group or a carboxy group on the benzene ring, specific examples thereof include, for example, unsubstituted benzoylamino, as well as chlorine atom-substituted benzoylamino groups such as 2-chlorobenzoylamino, 4-chlorobenzoylamino and 2,4-dichlorophenylamino; unsubstituted C1-C4 alkyl-substituted benzoylamino groups such as 2-methylbenzoylamino, 3-methylbenzoylamino and 4-methylbenzoylamino; nitro-substituted benzoylamino groups such as 2-nitrobenzoylamino, 4-nitrobenzoylamino and 3,5-dinitrobenzoylamino; sulfo-substituted benzoylamino groups such as 2-sulfobenzoylamino and 4-sulfobenzoylamino; carboxy-substituted benzoylamino groups such as 2-carboxybenzoylamino, 4-carboxybenzoylamino and 3,5-dicarboxybenzoylamino; and the like.

When $R^8$ to $R^{10}$ in the formula (1) are a phenylsulfonylamino group unsubstituted, or substituted with a chlorine atom, an unsubstituted C1-C4 alkyl group, a nitro group, a sulfo group or a carboxy group on the benzene ring, specific examples thereof include, for example, unsubstituted phenylsulfonylamino, as well as chlorine atom-substituted phenylsulfonylamino groups such as 2-chlorophenylsulfonylamino and 4-chlorophenylsulfonylamino; unsubstituted C1-C4 alkyl-substituted phenylsulfonylamino groups such as 2-methylphenylsulfonylamino, 4-methylphenylsulfonylamino and 4-tert-butylphenylsulfonylamino; nitro-substituted phenylsulfonylamino groups such as 2-nitrophenylsulfonylamino, 3-nitrophenylsulfonylamino and 4-nitrophenylsulfonylamino; sulfo-substituted phenylsulfonylamino groups such as 3-sulfophenylsulfonylamino and 4-sulfophenylsulfonylamino; carboxy-substituted phenylsulfonylamino groups such as 3-carboxyphenylsulfonylamino and 4-carboxyphenylsulfonylamino; and the like.

Specific examples of preferable $R^8$ to $R^{10}$ in the formula (1) include a hydrogen atom, a chlorine atom, carboxy, sulfo, methyl, ethyl, methoxy, ethoxy, 2-hydroxyethoxy, 2-sulfoethoxy, 3-sulfopropoxy, 4-sulfobutoxy, carboxymethoxy, 2-carboxyethoxy, methylamino, ethylamino, 2-hydroxyethylamino, 2-sulfoethylamino, 3-sulfopropylamino, 2-carboxyethylamino, dimethylamino, diethylamino, 2,2'-dihydroxydiethylamino, 2,2'-dicarboxydiethylamino, 3,3'-disulfodipropylamino, acetylamino, 3-carboxypropanoylamino, 4-hydroxybutanoylamino, N'-carboxymethylureide, N'-2-sulfoethylureide, 4-sulfophenylamino, 2,4-disulfophenylamino, 2,5-dicarboxyphenylamino, benzoylamino, 3-sulfobenzoylamino, 2-carboxybenzoylamino, phenylsulfonylamino, 4-methylphenylsulfonylamino, 4-nitrophenylsulfonylamino, 3-sulfophenylsulfonylamino, 4-carboxyphenylsulfonylamino and the like, more preferably, a hydrogen atom, a chlorine atom, sulfo, methyl, methoxy, 2-hydroxyethoxy, 2-sulfoethoxy, 3-sulfopropoxy, 4-sulfobutoxy, dimethylamino, 3,3'-disulfodipropylamino, acetylamino, 3-carboxypropanoylamino, N'-2-sulfoethylureide, 2,4-disulfophenylamino, benzoylamino and 4-methylphenylsulfonylamino, and still more preferably, a hydrogen atom, sulfo, methyl, methoxy and 3-sulfopropoxy.

In preferable combinations of $R^8$ to $R^{10}$ in the formula (1), $R^8$ is sulfopropylthio or sulfobutylthio, preferably 3-sulfopropylthio or 4-sulfobutylthio, and more preferably sulfopropylthio; $R^9$ is a hydrogen atom; and $R^{10}$ is a hydrogen atom, a chlorine atom, acetylamino, methyl or ethyl, methoxy or ethoxy, or sulfopropoxy, preferably a chlorine atom, acetylamino, methyl, or methoxy, and more preferably a chlorine atom.

Preferable options of the compound represented by the above formula (1) include compounds represented by the above formula (2). In the formula (2), the group A, $R^1$ to $R^{10}$, and the rings having substitution with $R^8$ to $R^{10}$ may be the same as those in the above formula (1) including the ring represented by the dotted line as well as preferable options, etc.

Preferable options of the compound represented by the above formula (2) include compounds represented by the above formula (3). In the formula (3), the group A, and $R^1$ to $R^{10}$ may be the same as those in the above formula (1) including preferable options etc.

Preferable options of the compound represented by the above formula (3) include compounds represented by the above formula (4). In the above formula (4), the group A, and $R^1$ to $R^4$ may be the same as those in the above formula (1) including preferable options etc.

$R^5$ and $R^7$ each independently represent a hydrogen atom; a chlorine atom; a C1-C4 alkylcarbonylamino group unsubstituted, or substituted with a hydroxy group or a carboxy group; an unsubstituted C1-C4 alkyl group; or a C1-C4 alkoxy group unsubstituted, or substituted with a sulfo group or a hydroxy group, and $R^6$ represents a hydrogen atom.

$R^5$ and $R^7$ in the formula (4) may be the same as those from among $R^5$ and $R^7$ in the above formula (1) including preferable options etc.

Preferable options of the compound represented by the above formula (4) include compounds represented by the above formula (5). In the above formula (5), the group A, and $R^1$ to $R^4$ may be the same as those in the above formula (1) including preferable options etc.

$R^5$ to $R^7$ may be the same as those in the above formula (4) including preferable options etc.

$R^8$ and $R^{10}$ each independently represent a hydrogen atom; a chlorine atom; a C1-C4 alkylcarbonylamino group unsubstituted, or substituted with a hydroxy group or a carboxy group; a sulfo C1-C4 alkoxy group; an unsubstituted C1-C4 alkyl group; a C1-C4 alkoxy group unsubstituted, or substituted with a sulfo group; or a C1-C4 alkylthio group substituted with a sulfo group or a carboxy group, and $R^9$ represents a hydrogen atom.

$R^8$ and $R^{10}$ in the formula (5) may be the same as those from among $R^8$ and $R^{10}$ in the above formula (1) including preferable options etc.

In the above formulae (1) to (5), preferable options as the group A are the groups represented by the above formula (6).

In the above formula (6), $R^{11}$ to $R^{14}$ each independently represent a group selected from the group consisting of a hydrogen atom; a chlorine atom; a sulfo group; a nitro group; a hydroxy group; a sulfamoyl group; a C1-C4 alkoxy group unsubstituted, or substituted with a hydroxy group, an unsubstituted C1-C4 alkoxy group, a sulfo group or a carboxy group; and a C1-C4 alkylsulfonyl group unsubstituted, or substituted with a hydroxy group, a sulfo group or a carboxy group.

When $R^{11}$ to $R^{14}$ in the formula (6) are a C1-C4 alkoxy group unsubstituted, or substituted with a hydroxy group, an unsubstituted C1-C4 alkoxy group, a sulfo group or a carboxy group, the alkoxy group may be the same as those when $R^5$ to $R^7$ in the above formula (1) are corresponding C1-C4 alkoxy groups, also including preferable options.

When $R^{11}$ to $R^{14}$ in the formula (6) are a C1-C4 alkylsulfonyl group unsubstituted, or substituted with a hydroxy group, a sulfo group or a carboxy group, specific examples thereof include, for example, straight or branched unsubstituted C1-C4 alkylsulfonyl groups such as methylsulfonyl, ethylsulfonyl, propylsulfonyl, isopropyl sulfonyl, n-butylsulfonyl, sec-butylsulfonyl and tert-butylsulfonyl; hydroxy C1-C4 alkylsulfonyl groups such as 2-hydroxyethylsulfonyl and 3-hydroxypropylsulfonyl; sulfo C1-C4 alkylsulfonyl groups such as 2-sulfopropylsulfonyl, 3-sulfopropylsulfonyl and 4-sulfobutylsulfonyl; carboxy C1-C4 alkylsulfonyl groups such as carboxymethylsulfonyl, 2-carboxyethylsulfonyl and 3-carboxypropylsulfonyl; and the like.

Specific examples of preferable $R^{11}$ to $R^{14}$ in the formula (6) include a hydrogen atom, a chlorine atom, sulfo, nitro, methoxy, ethoxy, 2-hydroxyethoxy, 2-sulfoethoxy, 3-sulfopropoxy, 4-sulfobutoxy, carboxymethoxy, 2-carboxyethoxy, methylsulfonyl, ethylsulfonyl, tert-butylsulfonyl, 2-hydroxyethylsulfonyl, 3-sulfopropylsulfonyl, 2-carboxyethylsulfonyl, phenylsulfonyl, 4-chlorophenylsulfonyl, 4-methylphenylsulfonyl, 2,4-dimethyl phenylsulfonyl, 4-nitrophenylsulfonyl, 4-sulfophenylsulfonyl, 2-carboxyphenylsulfonyl, 4-carboxyphenylsulfonyl and the like, more preferably, a hydrogen atom, a chlorine atom, sulfo, nitro, methoxy and methylsulfonyl, and still more preferably a hydrogen atom, sulfo, methoxy and 3-sulfopropoxy. Among $R^{11}$ to $R^{14}$, at least one is preferably a hydrogen atom, and at least one is preferably a substituent other than a hydrogen atom.

In preferable combinations of $R^{11}$ to $R^{14}$ in the formula (6), two are sulfo and the remaining two are a hydrogen atom, or three are sulfo and the remaining one is a hydrogen atom, and the latter combination is more preferred. When three are sulfo and the remaining one is a hydrogen atom, the positions of substitution with sulfo are more preferably positions 4, 6 and 8 on the naphthothiazole ring.

Compounds in which preferable options are combined are more preferred, and compounds in which more preferable options are combined are still more preferred as described in connection with each substituent etc., in the above formulae (1) to (6). In addition, compounds in which still more preferable options are combined are similarly even more preferred. It is to be noted that as described above, in the formulae (7) to (8), n, group A, the rings having substitution with $R^1$ to $R^{10}$ have the same meanings as those in the above formula (1) including the ring represented by the dotted line. Also, the same may be applied to preferable options, compounds in which preferable options are combined, and the like.

The salt of the trisazo compound represented by the above formula (1) is an inorganic or organic cation salt. Of these, specific examples of the inorganic salt include alkali metal salts, alkaline earth metal salts and ammonium salts, and preferable inorganic salts include lithium, sodium and potassium salts, and ammonium salts. Furthermore, examples of the organic cation salt include salts with a quaternary ammonium compound represented by the following formula (9) but not limited thereto. Moreover, mixtures of free acids, tautomers thereof, and their various types of salts are also acceptable. For example, any combination of mixtures of a sodium salt and ammonium salt, mixtures of a free acid and sodium salt, mixtures of a lithium salt, sodium salt and ammonium salt, etc., may be used. Physical property values such as solubility may vary corresponding to the type of the salt, and thus the type of the salt may be selected as needed ad libitum, or a mixture having physical properties appropriate for the object can be obtained by changing the ratio of the salts when a plurality of salts and the like are included.

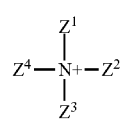

(9)

In the formula (9), $Z^1$, $Z^2$, $Z^3$ and $Z^4$ each independently represent a group selected from the group consisting of a hydrogen atom, an alkyl group, a hydroxyalkyl group, and a hydroxyalkoxyalkyl group.

Specific examples of the alkyl groups represented by $Z^1$, $Z^2$, $Z^3$ and $Z^4$ in the formula (9) include methyl, ethyl, n-propyl, isopropyl, n-butyl, isobutyl, sec-butyl, tert-butyl, and the like. Specific examples of the hydroxyalkyl group include hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl. Examples of the hydroxyalkoxyalkyl group include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl, and hydroxyethoxy C1-C4 alkyl is preferred among these. Particularly preferable options include a hydrogen atom; methyl; hydroxy C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; and hydroxyethoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of combinations of $Z^1$, $Z^2$, $Z^3$ and $Z^4$ in preferable compounds represented by the formula (9) are shown in Table 1 below.

TABLE 1

| Compound No. | Z1 | Z2 | Z3 | Z4 |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |
| 1-11 | CH3 | —C2H4OH | CH3 | —C2H4OH |
| 1-12 | CH3 | —CH2CH(OH)CH3 | CH3 | —CH2CH(OH)CH3 |

The trisazo compound represented by the above formula (1) may be synthesized according to, for example, the following method. Note that acidic functional groups of the compound in each step are represented in the form of their free acids for the sake of simplicity. Furthermore, in the following formulae (10) to (15), the group A, $R^1$ to $R^{10}$, the rings having substitution with $R^5$ to $R^{10}$ have the same meanings as those in the above formula (1), respectively, including rings represented by the dotted line.

The compound represented by the following formula (10) is diazotized according to a common procedure, and the product and a compound represented by the following formula (11) are subjected to a coupling reaction according to a common procedure to obtain a compound represented by the following formula (12). It is to be noted that the compound represented by the formula (10) can be synthesized according to a method disclosed in Patent Document 10. Furthermore, the compounds represented by the following formulae (11) and (13) can be synthesized according to a common procedure.

A —NH₂ (10)

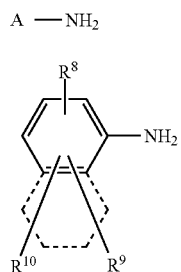
(11)

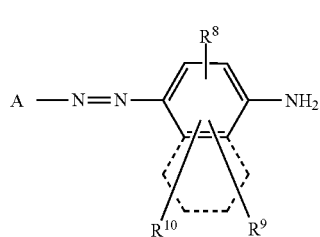
(12)

After the compound represented by the formula (12) obtained is diazotized according to a common procedure, the product and a compound represented by the following formula (13) are subjected to a coupling reaction according to a common procedure to obtain a compound represented by the following formula (14).

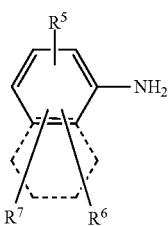
(13)

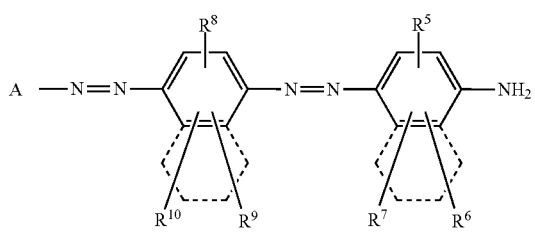
(14)

After the compound represented by the formula (14) obtained is diazotized according to a common procedure, the product and a compound represented by the following formula (15) are subjected to a coupling reaction according to a common procedure, whereby the trisazo compound of the present invention represented by the above formula (1) can be obtained.

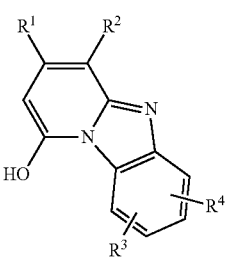
(15)

It is to be noted that the compound represented by the above formula (15) can be synthesized according to a method disclosed in Patent Document 5.

Specific examples of suitable compound of the present invention represented by the above formula (1) include compounds, etc., represented by the structural formulae shown in the following Tables 2 to 13, although not particularly limited thereto.

In each Table, the functional groups such as sulfo group and carboxy group are represented in the form of their free acids for the sake of simplicity.

TABLE 2

| Compound No. | Structural Formula |
|---|---|
| 1 | |
| 2 | |
| 3 | |
| 4 | |

TABLE 2-continued

| Compound No. | Structural Formula |
|---|---|
| 5 | (chemical structure) |

TABLE 3

| Compound No. | Structural Formula |
|---|---|
| 6 | (chemical structure) |
| 7 | (chemical structure) |
| 8 | (chemical structure) |

TABLE 3-continued
| Compound No. | Structural Formula |
|---|---|
| 9 | 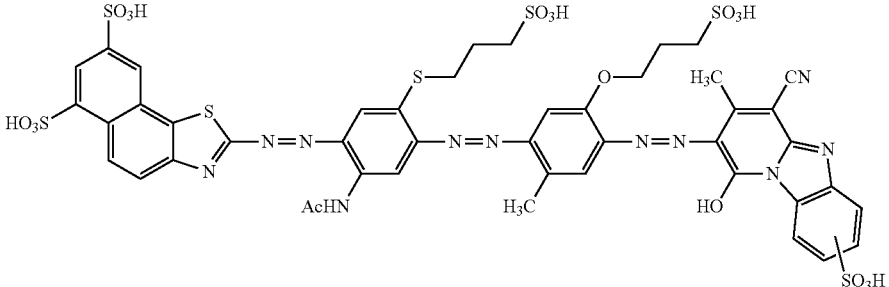 |
| 10 | 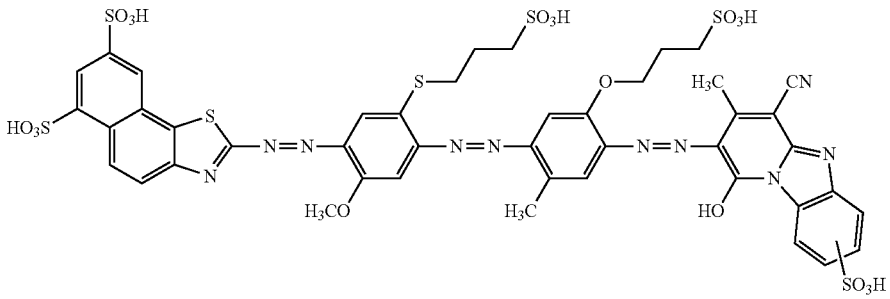 |
TABLE 4
| Compound No. | Structural Formula |
|---|---|
| 11 | 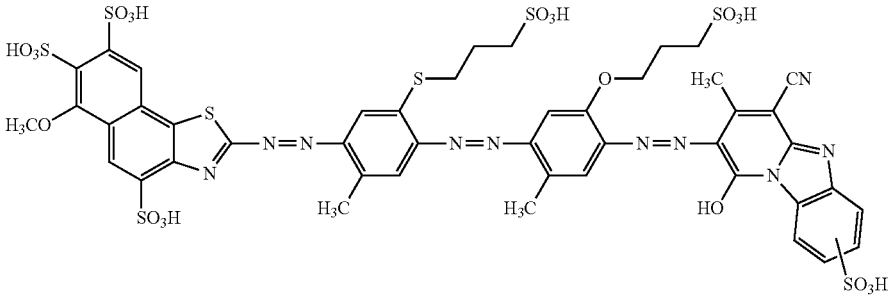 |
| 12 | 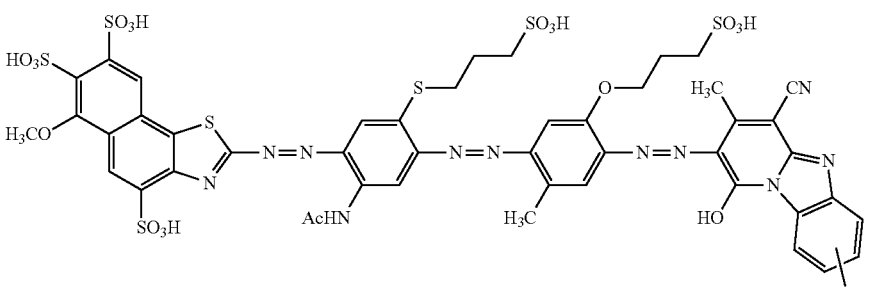 |

TABLE 4-continued

| Compound No. | Structural Formula |
|---|---|
| 13 | (structure) |
| 14 | (structure) |
| 15 | (structure) |

TABLE 5

| Compound No. | Structural Formula |
|---|---|
| 16 | (structure) |

TABLE 5-continued

| Compound No. | Structural Formula |
|---|---|
| 17 | |
| 18 | |
| 19 | |
| 20 | |

TABLE 6

| Compound No. | Structural Formula |
|---|---|
| 21 | (structure) |
| 22 | (structure) |
| 23 | (structure) |
| 24 | (structure) |
| 25 | (structure) |

TABLE 7

| Compound No. | Structural Formula |
|---|---|
| 26 | |
| 27 | |
| 28 | |
| 29 | |
| 30 | |

TABLE 8

| Compound No. | Structural Formula |
| --- | --- |
| 31 | (structure) |
| 32 | (structure) |
| 33 | (structure) |
| 34 | (structure) |
| 35 | (structure) |

TABLE 9

| Compound No. | Structural Formula |
|---|---|
| 36 | |
| 37 | |
| 38 | |
| 39 | |
| 40 | |

TABLE 10

| Compound No. | Structural Formula |
| --- | --- |
| 41 | |
| 42 | |
| 43 | |
| 44 | |
| 45 | |

TABLE 11
| Compound No. | Structural Formula |
|---|---|
| 46 | 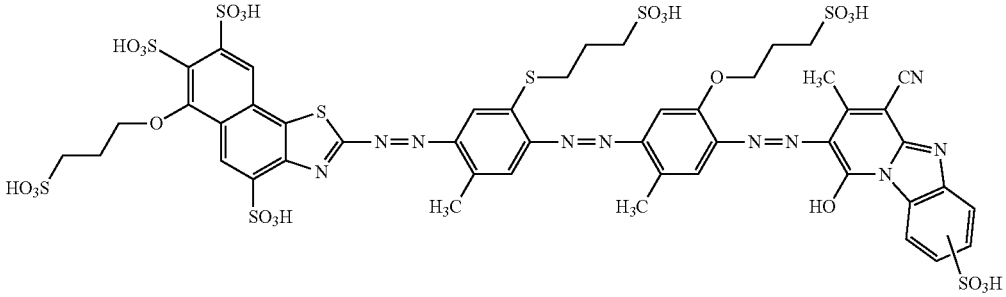 |
| 47 | 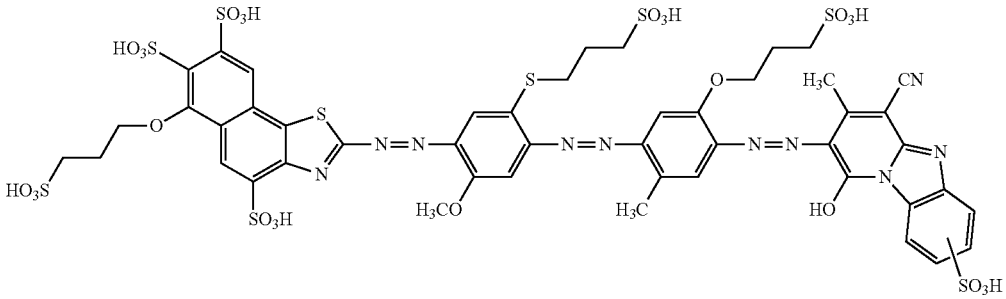 |
| 48 | 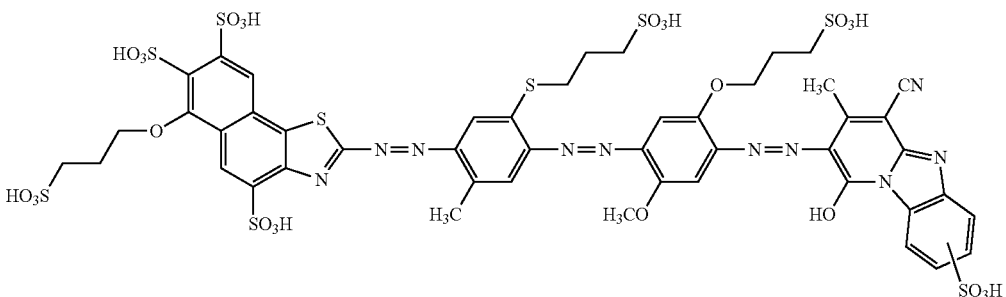 |
| 49 | 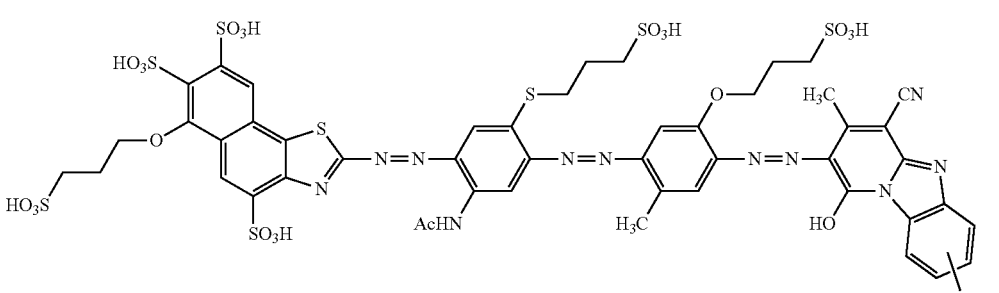 |
| 50 | 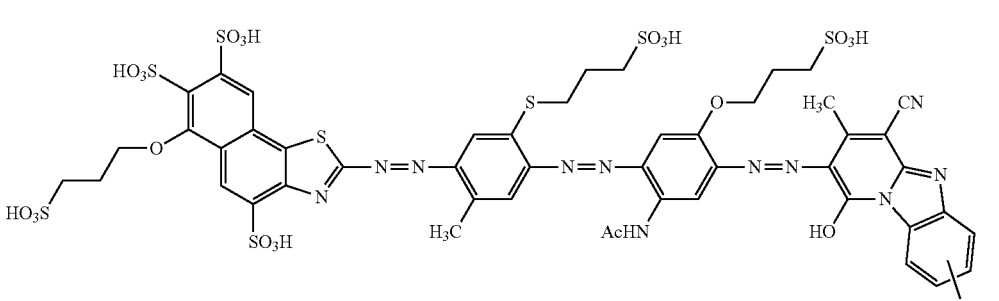 |

TABLE 12
| Compound No. | Structural Formula |
|---|---|
| 51 | 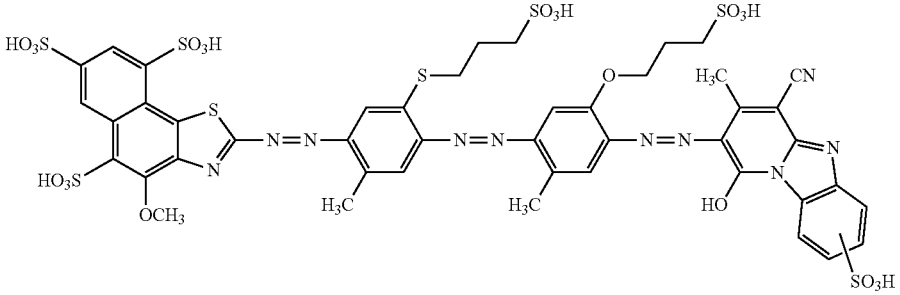 |
| 52 | 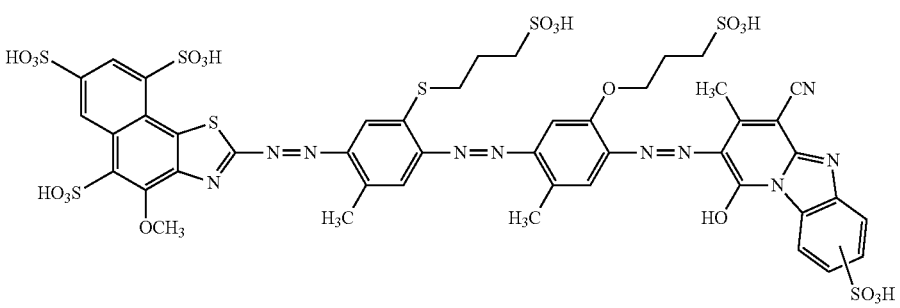 |
| 53 | 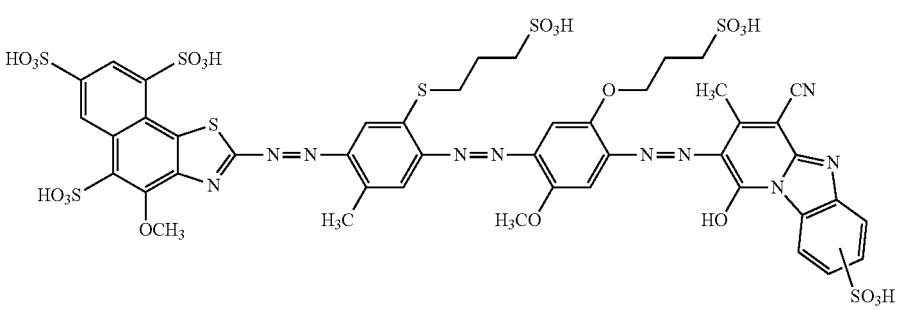 |
| 54 | 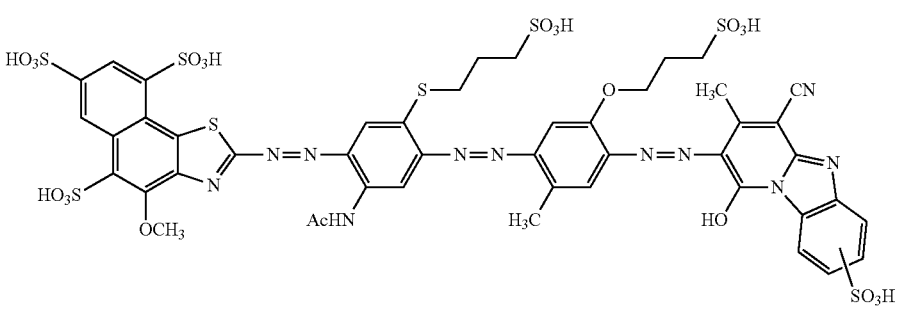 |
| 55 | 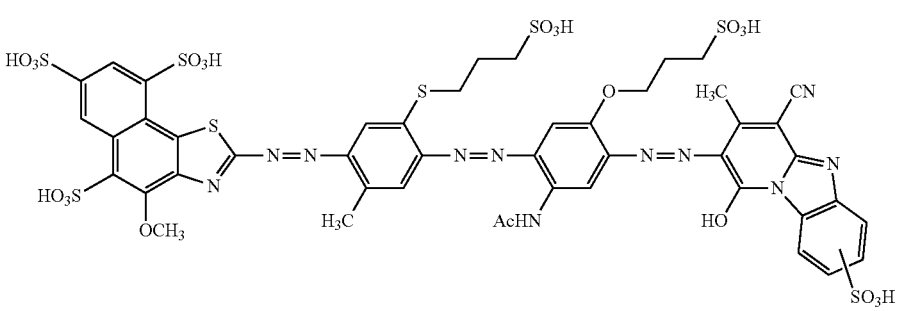 |

TABLE 13

| Compound No. | Structural Formula |
|---|---|
| 56 | |
| 57 | |
| 58 | |
| 59 | |

TABLE 13-continued

| Compound No. | Structural Formula |
|---|---|
| 60 | (structure shown) |

Diazotization of the compound represented by the above formula (10) is carried out according to a method well known per se. For example, diazotization is carried out in sulfuric acid, acetic acid or phosphoric acid, at a temperature of, for example −5 to 20° C., and preferably 5 to 10° C. using nitrosyl sulfuric acid. Coupling of the diazotized product of the compound represented by the formula (10) with the compound represented by the formula (11) is also carried out according to a method well known per se. For example, coupling is carried out in water or an aqueous organic medium (mixture of water with a water soluble organic solvent, etc.), at a temperature of, for example, −5 to 30° C., and preferably 10 to 30° C. The compound represented by the formula (10), and the compound represented by the formula (11) are used in approximately stoichiometric amounts.

Diazotization of the compound represented by the formula (12) is also carried out according to a method well known per se. For example, diazotization is carried out in the presence of an inorganic acid such as hydrochloric acid or sulfuric acid in water or an aqueous organic medium, at a temperature of, for example, −5 to 40° C., and preferably 5 to 30° C. using a nitrite salt, for example, a nitrous acid alkali metal salt such as sodium nitrite. Coupling of the diazotized product of the compound represented by the formula (12) with the compound represented by the formula (13) is also carried out under conditions well known per se. For example, it is advantageous to carry out such a coupling reaction in water or an aqueous organic medium, at a temperature of, for example, −5 to 50° C., and preferably 10 to 30° C., and at a pH value of from weakly acidic to alkaline. Preferably coupling is carried out at a pH value of from weakly acidic to weakly alkaline, for example, at a pH of 6 to 10. Since the diazotization reaction liquid is acidic, and the reaction system is further acidified as the coupling reaction proceeds, adjustment to the aforementioned pH value is preferably conducted by adding a base. As the base, for example, an alkali metal hydroxide such as lithium hydroxide or sodium hydroxide, an alkali metal carbonate such as lithium carbonate, sodium carbonate or potassium carbonate, an acetic acid salt such as sodium acetate, ammonia, an organic amine or the like may be used. The compound represented by the formula (12) and the compound represented by the formula (13) are used in approximately stoichiometric amounts.

Diazotization of the compound represented by the formula (14) is also carried out according to a method well known per se. For example, diazotization is carried out in the presence of an inorganic acid such as hydrochloric acid or sulfuric acid in water or an aqueous organic medium (mixture of water with a water soluble organic solvent, etc.), at a temperature of, for example, −5 to 40° C., and preferably 10 to 30° C. using a nitrite salt, for example, a nitrous acid alkali metal salt such as sodium nitrite. Coupling of the diazotized product of the compound represented by the formula (14) with the compound represented by the formula (15) is also carried out under conditions well known per se. For example, it is advantageous to carry out such coupling in water or an aqueous organic medium, at a temperature of, for example, −5 to 50° C., and preferably 10 to 30° C., and at a pH value of from weakly acidic to alkaline. Preferably coupling is carried out at a pH value of from weakly acidic to weakly alkaline, for example, at a pH of 6 to 10, and adjustment of the pH value is conducted by adding a base. As the base, those described above may be used. The compound represented by the formula (14) and the compound represented by the formula (15) are used in approximately stoichiometric amounts.

In order to produce a desired salt of the trisazo compound represented by the formula (1) of the present invention, after completing the coupling reaction, salting-out may be carried out by adding a desired inorganic salt or organic cation salt to the reaction liquid. Alternatively, a mineral acid such as hydrochloric acid is added to isolate the compound in the form of a free acid, which is washed with water, acidic water, an aqueous organic medium or the like as needed to remove the inorganic salt, and thereafter the free acid is neutralized with a desired inorganic or organic base in an aqueous medium, thereby giving a solution of the corresponding salt. The acidic water referred to herein is, for example, prepared by dissolving a mineral acid such as sulfuric acid or hydrochloric acid, or an organic acid such as acetic acid in water to be acidic. In addition, the aqueous organic medium referred to herein means organic substances containing water and being miscible with water, as well as so-called organic solvents that are miscible with water, and the like. Specific examples include water soluble organic solvent described later, and the like. Examples of the inorganic salt include alkali metal salts such as lithium chloride, sodium chloride and potassium chloride, ammonium salts such as ammonium chloride and ammonium bromide. Examples of the organic cation salt include halogen salts of the organic amine represented by the formula (9) described above, and the like. Examples of the inorganic base include, for example, hydroxides of alkali metals such as lithium hydroxide, sodium hydroxide and potassium hydroxide, ammonium hydroxides, as well as carbonates of alkali metals such as lithium carbonate, sodium carbonate and potassium carbonate. Examples of the organic base include organic amines, for example, quaternary ammoniums represented by the formula (9) such as diethanolamine and triethanolamine described above, and the like, but not limited thereto.

The ink composition of the present invention is explained below. An aqueous ink composition containing the trisazo compound represented by the above formula (1) of the present invention is capable of staining materials composed of cellulose. In addition, staining of other materials having a carbon amide bond is also possible, and thus the ink composition can be used extensively for staining leather, textile fabric and paper. On the other hand, according to typical methods of using the compound of the present invention, the ink composition is prepared by dissolving in a liquid medium, which is particularly suited as an ink composition for use in ink jet printing.

A reaction liquid containing the trisazo compound of the present invention represented by the above formula (1), for example, a reaction liquid before subjecting to salting-out with sodium chloride in Example 1 (Step 5) described later, and the like, may be used directly for producing the ink composition. Additionally, the liquid is first subjected to: drying, for example, spray drying to permit isolation; salting-out by adding an inorganic salt such as sodium chloride, potassium chloride, calcium chloride or sodium sulfate; acid precipitation by adding a mineral acid such as hydrochloric acid, sulfuric acid or nitric acid; or acid-salt precipitation in which the aforementioned salting-out and the acid precipitation are carried out in combination; or the like to isolate the trisazo compound of the present invention, and an ink composition may be prepared using the same.

The ink composition of the present invention contains the trisazo compound represented by the formula (1) of the present invention in an amount of usually 0.1 to 20% by mass, preferably 1 to 10% by mass, and more preferably 2 to 8% by mass, with the rest being a medium mainly constituted with water. The ink composition of the present invention may further contain a water soluble organic solvent in an amount of, for example, 0 to 30% by mass, and an ink preparation agent in an amount of, for example, 0 to 10% by mass. Moreover, other coloring matter may be also contained for the purpose of adjusting the color as desired. Also in this case, the total mass of the coloring matters including the coloring matter for adjusting the color contained in the total mass of the ink composition may fall within the above range. It is to be noted that the pH of the ink composition is preferably 5 to 11, and more preferably 7 to 10 in light of improvement of the storage stability. Moreover, the surface tension of the ink composition is preferably 25 to 70 mN/m, and more preferably 25 to 60 mN/m. Furthermore, the viscosity of the ink composition is preferably no greater than 30 mPa·s, and more preferably no greater than 20 mPa·s. The pH and the surface tension of the ink composition of the present invention may be adjusted appropriately with the pH adjusting agent or surfactant as described later.

The ink composition of the present invention is prepared by dissolving the trisazo compound represented by the above formula (1) in water or a water soluble organic solvent (organic solvent that is miscible with water), and adding thereto an ink preparation agent as needed. For the purpose of preparing a black ink composition that is purely black and neutral, and the like, other coloring matter for adjusting the color, etc., may be added appropriately to the trisazo compound of the present invention. When the ink composition is used as an ink for an ink jet printer, the trisazo compound of the present invention having the content of inorganic impurities such as metal cation chlorides and sulfuric acid salts as low as possible is preferably used. The reference standard of the content of the inorganic impurities is about no greater than 1% by mass relative to the total mass of the coloring matter. For producing the azo compound of the present invention having a lower content of inorganic impurities, a desalting treatment may be carried out by, for example, a common method with a reverse osmosis membrane, a method in which a dried matter or wet cake of the azo compound of the present invention is stirred in a mixed solvent of an alcohol such as methanol with water, and separating the deposited matter by filtration, followed by drying, or the like.

Specific examples of the water soluble organic solvent which can be used in preparing the ink composition include, for example, C1-C4 alkanols such as methanol, ethanol, propanol, isopropanol, butanol, isobutanol, secondary butanol and tertially butanol; carboxylic amides such as N,N-dimethyl formamide and N,N-dimethylacetamide; lactams such as 2-pyrrolidone, N-methyl-2-pyrrolidone and N-methylpyrrolidin-2-one; cyclic ureas such as 1,3-dimethylimidazolidin-2-one and 1,3-dimethylhexahydropyrimid-2-one; ketones or ketoalcohols such as acetone, methyl ethyl ketone and 2-methyl-2-hydroxypentan-4-one; cyclic ethers such as tetrahydrofuran and dioxane; mono-, oligo-, or poly-alkylene glycols or thioglycols having a C2-C6 alkylene unit such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol and dithiodiglycol; polyol(triol) such as glycerin and hexane-1,2,6-triol; C1-C4 alkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether(butylcarbitol)triethylene glycol monomethyl ether and triethylene glycol monoethyl ether; γ-butyrolactone, dimethyl sulfoxide, and the like. These organic solvents may be used alone, or two or more of them may be used in combination.

As the ink preparation agent which may be appropriately used in preparing the ink composition, for example, a preservative and fungicide, a pH adjusting agent, a chelating agent, a rust-preventive agent, a water soluble ultraviolet ray absorbing agent, a water soluble polymer compound, a coloring matter solubilizer, an antioxidant, a surfactant, and the like may be included. These agents are explained in the following.

Specific examples of the fungicide include sodium dehydroacetate, sodium benzoate, sodium pyridinethion-1-oxide, p-hydroxybenzoic acid ethyl ester, 1,2-benzisothiazolin-3-one and salts thereof, and the like. These are preferably used in the ink composition in an amount of 0.02 to 1.00% by mass.

Specific examples of the preservative include, for example, organic sulfur based, organic nitrogen sulfur based, organic halogen based, haloallyl sulfone based, iodopropargyl based, N-haloalkylthio based, nitrile based, pyridine based, 8-oxyquinoline based, benzothiazole based, isothiazoline based, dithiol based, pyridineoxide based, nitropropane based, organic tin based, phenol based, quaternary ammonium salt based, triazine based, thiazine based, anilide based, adamantane based, dithiocarbamate based, brominated indanone based, benzyl bromo acetate based, or inorganic salt based compounds, and the like. Specific examples of the organic halogen based compound include, for example, pentachlorophenol sodium; specific examples of the pyridineoxide based compound include, for example, 2-pyridinethiol-1-oxide sodium; and specific examples of the isothiazoline based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like. Specific examples of the other preservative and fungicide include anhydrous sodium acetate, sodium sorbate, sodium benzoate, and the like.

As the pH adjusting agent, any arbitrary substance may be used as long as it can adjust the pH of the ink to fall within the range of, for example, 5 to 11 without adversely affecting the prepared ink. Specific examples thereof include, for example, alkanolamines such as diethanolamine, triethanolamine and N-methyldiethanolamine; hydroxides of alkali metals such as lithium hydroxide, sodium hydroxide and potassium hydroxide; ammonium hydroxide (aqueous ammonia); carbonates of alkali metals such as lithium carbonate, sodium carbonate, sodium bicarbonate and potassium carbonate; alkali metal salts of organic acids such as sodium silicate and potassium acetate; inorganic bases such as disodium phosphate, and the like.

Specific examples of the chelating agent include, for example, sodium ethylenediamine tetraacetate, sodium nitrilotriacetate, sodium hydroxyethylethylenediamine triacetate, sodium diethylenetriamine pentaacetate, sodium uracil diacetate, and the like.

Specific examples of the rust-preventive include, for example, acidic sulfite, sodium thiosulfate, ammonium thioglycolate, diisopropylammonium nitrite, pentaerythritol tetranitrate, dicyclohexylammonium nitrite, and the like.

Specific examples of the water soluble ultraviolet ray absorbing agent include, for example, sulfonated benzophenone based compounds, benzotriazole based compounds, salicylic acid based compounds, cinnamic acid based compounds, and triazine based compounds.

Specific examples of the water soluble polymer compound include polyvinyl alcohols, cellulose derivatives, polyamines, polyimines, and the like.

Specific examples of the coloring matter solubilizer include, for example, ε-caprolactam, ethylene carbonate, urea, and the like. Specific examples of the antioxidant which may be used include, for example, various types of organic and metal complex based discoloration-preventive agents.

Specific examples of the organic discoloration-preventive agent include hydroquinones, alkoxyphenols, dialkoxyphenols, phenols, anilines, amines, indanes, chromanes, alkoxyanilines, hetero rings, and the like.

Specific examples of the surfactant include, for example, anion based, cation based, or nonionic well-known surfactants, and the like.

Specific examples of the anionic surfactant include alkylsulfonic acid salts, alkylcarboxylic acid salts, α-olefin sulfonic acid salts, polyoxyethylenealkyl ether acetic acid salts, N-acylamino acid and salts thereof, N-acylmethyltaurine salts, alkylsulfuric acid salts, polyoxyalkyl ether sulfuric acid salts, alkylsulfuric acid salts, polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Specific examples of the cationic surfactant include 2-vinylpyridine derivatives, poly(4-vinylpyridine) derivatives, and the like.

Specific examples of the amphoteric surfactant include lauryldimethylamino acetate betaine, 2-alkyl-N-carboxymethyl-N-hydroxyethylimidazolinium betaine, coconut oil fatty acid amidepropyldimethylamino acetate betaine, polyoctylpolyaminoethylglycine, imidazoline derivatives, and the like.

Specific examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexin-3-ol; and other specific examples include trade names Surfynol 104, 105, 82, 465, Olfin STG manufactured by Nissin Chemical Co., Ltd., and the like.

These ink preparation agents may be used either alone or as a mixture.

The ink composition of the present invention is obtained by mixing the aforementioned each component in an arbitrary order, followed by stirring. Thus obtained ink composition may be filtrated through a membrane filter or the like if necessary in order to eliminate contaminants. Moreover, in order to adjust the black color as an ink composition, other coloring matter having a variety of hues may be admixed in addition to the trisazo compound represented by the formula (1) of the present invention. In such an instance, a coloring matter of black having other hue, as well as yellow (for example, C.I. Direct Yellow 34, C.I. Direct Yellow 58, C.I. Direct Yellow 86, C.I. Direct Yellow 132, C.I. Direct Yellow 161, etc.), orange (for example, C.I. Direct Orange 17, C.I. Direct Orange 26, C.I. Direct Orange 29, C.I. Direct Orange 39, C.I. Direct Orange 49, etc.), brown, scarlet (for example, C.I. Direct Red 89, etc.), red (for example, C.I. Direct Red 62, C.I. Direct Red 75, C.I. Direct Red 79, C.I. Direct Red 80, C.I. Direct Red 84, C.I. Direct Red 225, C.I. Direct Red 226, etc.), magenta (for example, C.I. Direct Red 227, etc.), violet, blue, navy, cyan, green, or the other colors may be used by mixing.

The ink composition of the present invention can be used in a variety of fields, and is suitable for aqueous writing inks, aqueous printing inks, information recording inks and the like. In particular, the ink composition is preferably used as an ink for ink jet, and is suitably used in the ink jet printing method of the present invention described below.

Next, the ink jet printing method of the present invention is explained. The ink jet printing method of the present invention is characterized by carrying out ink jet printing using the ink composition of the present invention described above. In the ink jet printing method of the present invention, recording is carried out using an ink for ink jet containing the ink composition on a record-receiving material, but the ink nozzle etc., used therein is not particularly limited, and may be selected appropriately in accordance with the purpose.

Well-known methods, for example, a charge control system in which an ink is discharged using an electrostatic attractive force; a drop-on-demand system (pressure pulse system) in which a vibration pressure of a piezo element is used; an acoustic ink jet system in which electric signals are converted into acoustic beam, which is irradiated onto an ink, and allowing the ink to be discharged utilizing the irradiation pressure; a thermal ink jet, i.e., a bubble-jet (registered trademark) system in which an ink is heated to from bubbles and the resulting pressure is utilized; and the like may be employed.

It is to be noted that the ink jet printing method also includes a system in which an ink having a low coloring matter concentration (coloring matter content) in the ink referred to as photo ink is ejected in a large number of droplets having a small volume; a system in which a plurality of inks having substantially the same hue and different coloring matter concentration in the ink are used to improve the image quality; a system in which a colorless transparent ink is used, and the like.

The colored body of the present invention was colored with the compound represented by the above formula (1) of the present invention or the ink composition containing the same, and more preferably, was colored with the ink composition of the present invention on a record-receiving material according to the ink jet printing method using an ink jet printer.

The record-receiving materials which can be colored are not particularly limited, but, for example, communication sheets such as a paper or film, a fiber or cloth (cellulose, nylon, wool, etc.), leather, substrates for color filters are exemplified, and of these, communication sheets are preferred.

The communication sheet is preferably obtained by subjecting a base material to a surface treatment, and specifically obtained by providing an ink receiving layer on a base material such as paper, synthetic paper, films and the like. The ink receiving layer is provided by, for example: a method in which a cation based polymer is impregnated in or coated on the aforementioned base material; a method in which inorganic fine particles that can absorb a coloring matter in an ink such as porous silica, alumina sol or special ceramics are coated on the surface of the aforementioned base material together with a hydrophilic polymer such as polyvinyl alcohol or polyvinylpyrrolidone; or the like. Such sheets provided with an ink receiving layer are generally referred to as ink jet exclusive paper, ink jet exclusive film, glossy paper, glossy film, and the like.

Among the aforementioned communication sheets, sheets coated with a porous white inorganic substance on the surface thereof have particularly high surface glossiness, as well as superior water resistance, and thus particularly suited for printing of photographic images. On the other hand, it is known that the images recorded thereon are subject to significant discoloration due to ozone gas. However, since the ink composition of the present invention has superior ozone gas resistance, a particularly significant effect is achieved when used for ink jet printing on such record-receiving materials.

Examples of typical commercially available product of the sheets coated with the porous white inorganic substance as described above on the surface thereof include trade names: Professional Photo Paper, Super Photo Paper, Gloss Gold and Matte Photo Paper manufactured by Canon, Inc.; trade names: Photo Paper CRISPIA (Super Glossy), Photo Paper (Glossy), and Photo Matte Paper manufactured by Seiko Epson Corporation; trade name: Advanced Photo Paper (Glossy) manufactured by Hewlett-Packard Japan, Ltd.; trade name: KASSAI SHASHIN-SHIAGE Pro manufactured by FUJIFILM Corporation; and the like.

For printing on a record-receiving material such as a communication sheet with the ink jet printing method of the present invention, for example, a vessel containing the ink composition is attached at a specified position of an ink jet printer, and the printing may be executed by a conventional method on the record-receiving material.

In the ink jet printing method of the present invention, the black ink composition of the present invention, and, for example, also ink compositions of each well-known color such as magenta, cyan, yellow, and if necessary, green, blue (or violet), red (or orange) and the like may be used in combination. The ink compositions of each color are filled in each of the vessels, respectively, and each of the vessels is loaded on prescribed position of an ink jet printer similarly to the vessel containing the black ink composition of the present invention, and used for ink jet printing.

The trisazo compound of the present invention is superior in water solubility, and the ink composition of the present invention containing this compound as a coloring matter exhibits favorable storage stability, without occurrence of solid deposition, physical property alteration, hue change and the like even though stored for a long period of time.

Moreover, the ink composition containing the trisazo compound of the present invention can be used for ink jet printing, and for use in writing instruments.

Still further, when printed on a communication sheet, particularly on an exclusive ink jet paper, high print density of the printed image, and in addition durability of the printed image, particularly superior ozone gas resistance and light resistance are achieved.

EXAMPLES

Hereinafter, the present invention is explained in more detail by way of Examples, but the present invention is not in any way limited to the following Examples.

In Examples, the expressions "part" and "%" are on the basis of the mass unless otherwise stated particularly, and each operation of synthetic reaction, crystallization and the like was carried out while stirring also unless otherwise stated particularly.

Furthermore, in each of the following formulae, functional groups such as sulfo and carboxy are represented in the form of their free acids for the sake of simplicity.

In addition, any of pH values and reaction temperatures described in Examples represents the value measured in the reaction system.

Furthermore, the wavelength of maximum absorption ($\lambda$max) of synthesized compounds was measured in an aqueous solution having a pH of 7 to 8, and thus measured value is appended to the measured compounds described in Examples.

It should be noted that any of the trisazo compound of the present invention synthesized exhibited a solubility in water of no less than 100 g/L.

Example 1

(Step 1)

A mixture of 17.1 parts of 4-chloro-3-nitrotoluene, 22.0 parts of sodium 3-mercaptopropane sulfonate, and 60 parts of dimethyl sulfoxide was heated to 60° C. while stirring, and thereto was added 11.2 parts of sodium carbonate. After the addition, the mixture was heated to 120 to 130° C., and stirred at the same temperature for 6 hrs. After the reaction liquid was cooled to room temperature, 330 parts of 2-propanol was added thereto. The deposited solid was separated by filtration, and the obtained solid was washed with 100 parts of 2-propanol. After thus obtained solid was added to 300 parts of water, the pH value was adjusted to 7.0 to 7.5 with 35% hydrochloric acid. Then, salting-out was carried out by adding sodium chloride, and the precipitated matter was separated by filtration to obtain a wet cake containing a compound represented by the following formula (16).

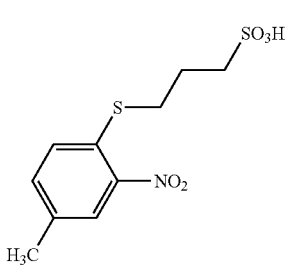

(16)

(Step 2)

To 120 parts of water were added 16.6 parts of iron powder and 3.1 parts of 35% hydrochloric acid, and the mixture was heated to 90° C. Forty minutes later, to this solution was added dropwise a suspension of the wet cake obtained in the above Step 1 in 60 parts of water over about 15 min. After the dropwise addition, the reaction liquid was stirred at 85 to 90° C. for 2 hrs, and cooled to room temperature. After the insoluble matter was filtered off, acid precipitation was carried out by adding 35% hydrochloric acid to the filtrate, and the resulting deposited solid was separated by filtration, followed by drying to obtain 16.7 parts of a compound represented by the following formula (17).

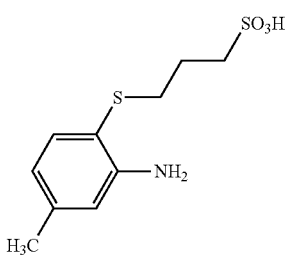

(17)

(Step 3)

In 260 parts of methanol was dissolved 29.2 parts of potassium thiocyanate, and then 26 parts of sulfuric acid and 30.4 parts of 2-naphthalene-5,7-disulfonic acid were added thereto. To the obtained solution was added dropwise 34 parts of 35% hydrogen peroxide water, and the mixture was stirred at 55 to 60° C. for 1 hour. After cooling to 20° C., 70 parts of 28% aqueous ammonia was added, and the deposited solid was separated by filtration to obtain 28.8 parts of a compound represented by the following formula (18).

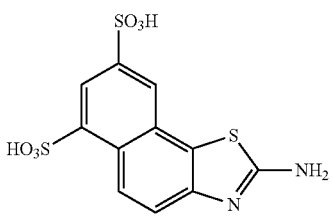

(18)

(Step 4)

After 18 parts of the compound represented by the above formula (18) was slowly added into 180 parts of 30% fuming sulfuric acid at 20 to 25° C., the temperature was elevated to 160° C., and then the mixture was stirred at the same temperature for 1 hour. The reaction liquid was added dropwise into 158 parts of ice water over about 15 min to obtain a solution containing a compound represented by the following formula (19). To this solution was added 6.3 parts of 60% nitric acid, and 25 parts of 40% nitrosyl sulfuric acid was added dropwise at 5 to 10° C. over about 10 min, followed by allowing for the reaction for 1 hour to obtain a diazo reaction liquid.

An aqueous solution was obtained by adding 13.1 parts of the compound represented by the above formula (17) and 7.0 parts of sulfamic acid to water 200 parts, and then adding sodium hydroxide to adjust the pH to 5.0 to 5.5.

To thus obtained aqueous solution was added dropwise the aforementioned diazo reaction liquid at a reaction temperature of 20 to 30° C. over about 20 min. After completing the dropwise addition, the liquid was stirred at the same temperature for 1 hour, and 800 parts of acetone was added thereto. Then, the deposited solid was separated by filtration to obtain a wet cake containing a compound represented by the following formula (20).

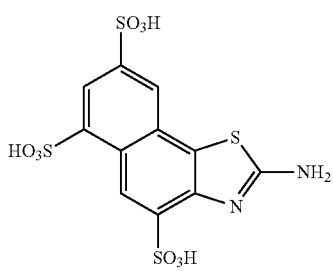

(19)

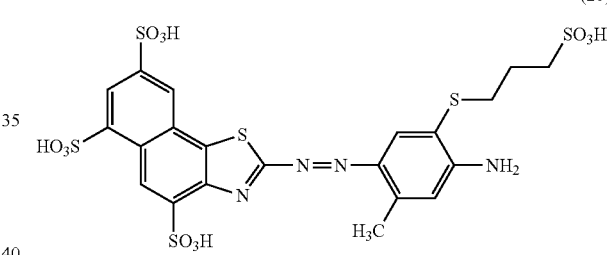

(20)

(Step 5)

An aqueous solution was obtained by adding the wet cake obtained in the above Step 4 to 110 parts of water, and then adjusting the pH to 7.0 to 7.5 by adding sodium hydroxide. To thus obtained aqueous solution was added dropwise 4.6 parts of 35% hydrochloric acid, and subsequently 4.6 parts of a 40% aqueous sodium nitrite solution at a reaction temperature of 15 to 20° C. over about 5 min, followed by allowing for the reaction for 1 hour to obtain a diazo reaction liquid.

On the other hand, an aqueous solution was obtained by adding 5.4 parts of a compound represented by the following formula (21) to 35 parts of water, and subsequently adjusting the pH to 5.0 to 5.5 by adding sodium hydroxide. To this aqueous solution was added dropwise the diazo reaction liquid obtained as described above at a reaction temperature of 20 to 30° C. over 20 min. During this procedure, sodium carbonate was added into the reaction system to maintain the pH value at 5.0 to 5.4.

After completing the dropwise addition, the mixture was stirred at the same temperature for 2 hrs. Then, salting-out was carried out by adding sodium chloride, and the deposited solid was separated by filtration to obtain a wet cake containing a compound represented by the following formula (22).

The compound represented by the following formula (21) was obtained according to a method disclosed in Japanese Unexamined Patent Application, Publication No. 2004-083492.

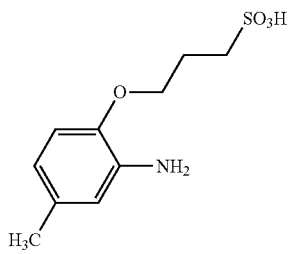

(21)

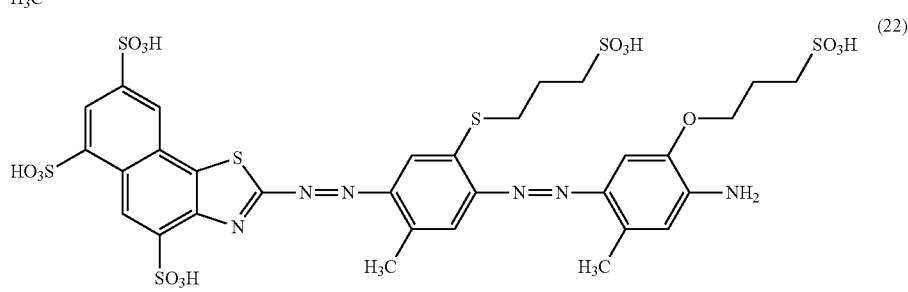

(22)

(Step 6)

The wet cake containing the compound represented by the formula (22) obtained in the above Step 5 was dissolved in 150 parts of water, and thereto were added dropwise 5.0 parts of 35% hydrochloric acid, and subsequently 1.8 parts of a 40% aqueous sodium nitrite solution at a reaction temperature of 20 to 25° C. over about 5 min, followed by allowing for the reaction for 1 hour to obtain a diazo reaction liquid.

On the other hand, an aqueous solution was obtained by adding 2.4 parts of a compound represented by the following formula (23) obtained by the method disclosed in Patent Document 8 to 55 parts of water, and subsequently adjusting the pH to 7.5 to 8.0 by adding sodium hydroxide. To this aqueous solution was added dropwise the diazo reaction liquid obtained as described above at a reaction temperature of 20 to 30° C. over 30 min. During this procedure, sodium carbonate was added into the reaction system to maintain the pH value at 7.0 to 8.0.

After completing the dropwise addition, the mixture was stirred at the same temperature for 2 hrs. Then, salting-out was carried out by adding sodium chloride, and the deposited solid was separated by filtration to obtain a wet cake. Thus obtained wet cake was dissolved in 160 parts of water, and thereto was added 350 parts of acetone, followed by separation of the deposited solid by filtration to obtain a wet cake. Thus obtained wet cake was again dissolved in 110 parts of water, and 280 parts of acetone was added thereto. Thereafter, the deposited solid was separated by filtration, and dried to obtain 7.2 parts of a compound represented by the following formula (24) (compound No. 1 in Table 2) of the present invention in the form of a sodium salt. λmax: 585 nm

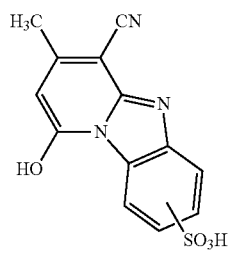

(23)

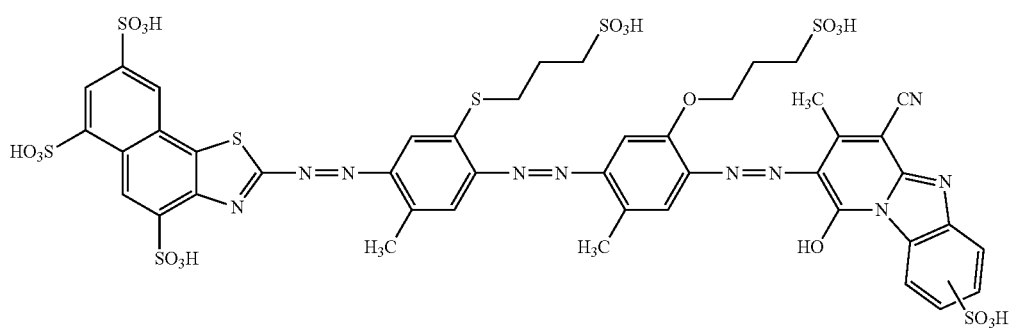

(24)

Example 2

(Step 1)

To 80 parts of a 25% aqueous sodium hydroxide solution were added 250 parts of water, 16.2 parts of tetrabutylammonium bromide and 25 parts of hydroquinone, and to the mixture was added dropwise over about 2 hrs a solution prepared by adding 180 parts of toluene to 88 parts of 1,3-propane sultone at 20° C. to 30° C. The reaction was allowed to proceed at the same temperature for 12 hrs to obtain a compound represented by the following formula (25). To the obtained compound was added 260 parts of acetic acid, and 17.0 parts of 60% nitric acid was slowly added dropwise while stirring at 15° C. to 25° C. After allowing the reaction to proceed at the same temperature for 2 hrs, the deposited solid was separated by filtration to obtain a wet cake containing a compound represented by the formula (26). An aqueous solution was obtained by adding to half amount of the obtained wet cake containing the compound 200 parts of water, and sodium hydroxide to adjust the pH to 6.0 to 6.5. Thus obtained aqueous solution was transferred into an autoclave, and thereto was added 1 part of 5% Pd/carbon. After allowing for the reaction while stirring at 20 to 30° C. under a hydrogen compression of 0.2-0.5 MPa until absorption of hydrogen ceased, the reaction was further continued for 30 min at the same temperature. The catalyst (5% Pd/carbon) was filtered off to obtain an aqueous solution containing a compound represented by the following formula (27).

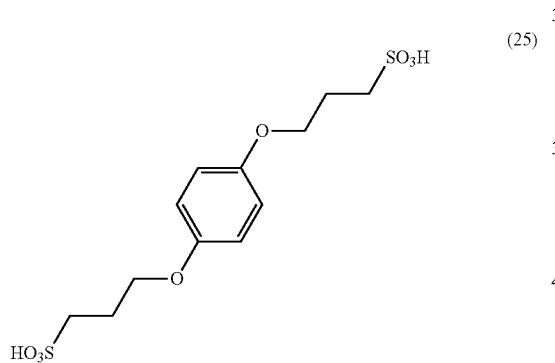

(25)

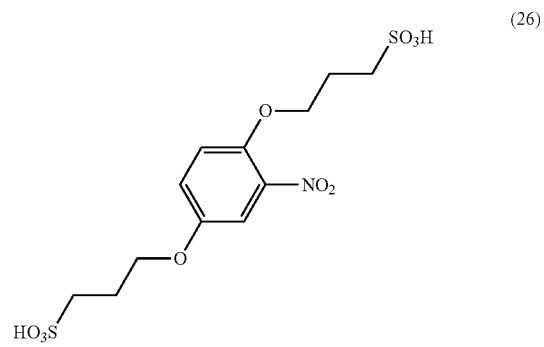

(26)

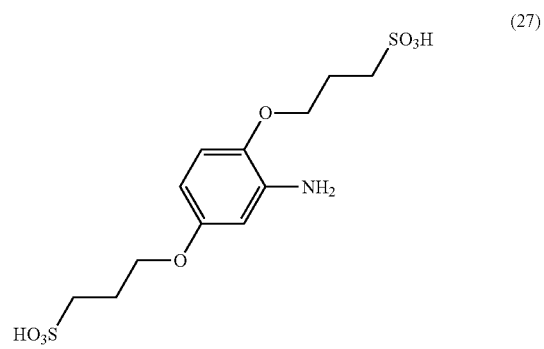

(27)

(Step 2)

In a similar manner to Example 1 except that the aqueous solution containing the compound represented by the formula (27) obtained in Example 2 (Step 1) was used in place of 5.4 parts of the compound represented by the formula (21) in Example 1 (Step 5), 7.5 parts of a compound represented by the following formula (28) (compound No. 21 in Table 6) of the present invention was obtained in the form of a sodium salt. λmax: 611.5 nm

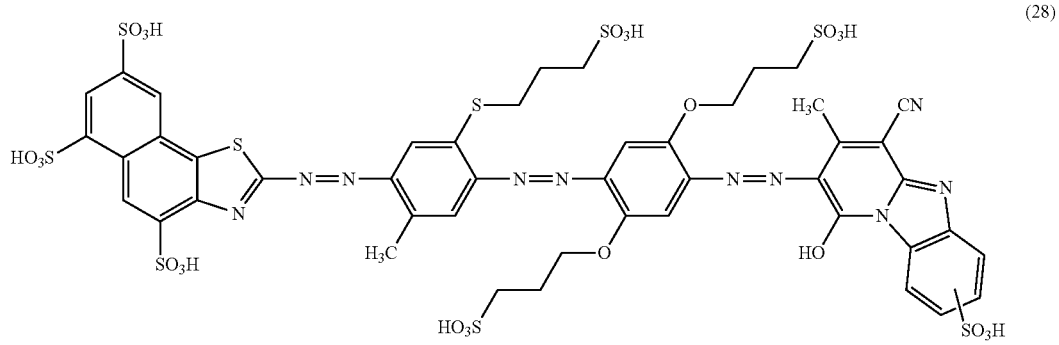

(28)

Example 3

(Step 1)

To 60 parts of N-methylpyrrolidone was added 15.6 parts of 4-amino-2-nitrophenol, and 12.3 parts of anhydrous acetic acid was added dropwise at 10 to 20° C. while stirring over about 5 min. After the reaction was allowed at the same temperature for 1 hour, the mixture was added dropwise to 70 parts of ice water over about 5 min. The deposited solid was separated by filtration and dried to obtain a compound represented by the following formula (29). To the obtained compound was added 60 parts of N-methylpyrrolidone, and 18.3 parts of 1,3-propane sultone was added dropwise while stirring at 70 to 80° C. over about 30 min. After the reaction was allowed at 110 to 120° C. for 3 hrs, the reaction liquid was cooled to 20 to 30° C., and 300 parts of isopropanol was added thereto. Thereafter, the deposited solid was separated by filtration to obtain a wet cake containing a compound represented by the following formula (30). Next, to the wet cake containing the compound represented by the formula (30) were added 170 parts of water, 1.8 parts of activated charcoal and 0.4 parts of anhydrous ferric chloride. To the mixture was added dropwise 15 parts of 80% hydrazine monohydrate while stirring at 70 to 80° C. over about 30 min. After the dropwise addition, the mixture was stirred at 85 to 95° C. for 3 hrs, and cooled to room temperature. After the insoluble matter was filtered off, acid precipitation was carried out by adding 50% sulfuric acid, and the resulting precipitated matter was separated by filtration to obtain a wet cake containing a compound represented by the following formula (31).

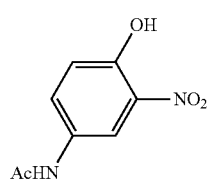

(29)

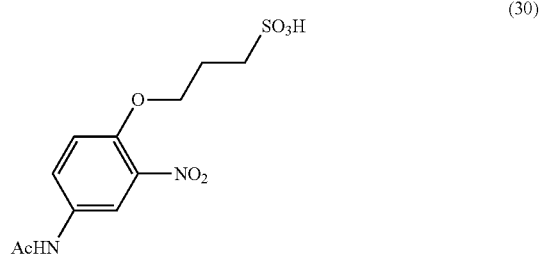

(30)

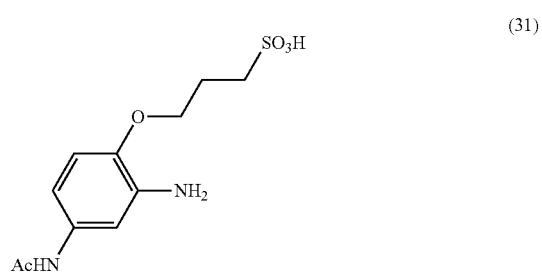

(31)

(Step 2)

In a similar manner to Example 1 except that the aqueous solution containing the compound represented by the formula (31) obtained in Example 3 (Step 1) was used in place of 5.4 parts of the compound represented by the formula (21) in Example 1 (Step 5), 4.3 parts of a compound represented by the following formula (32) (compound No. 3 in Table 2) of the present invention was obtained in the form of a sodium salt.

λmax: 599 nm

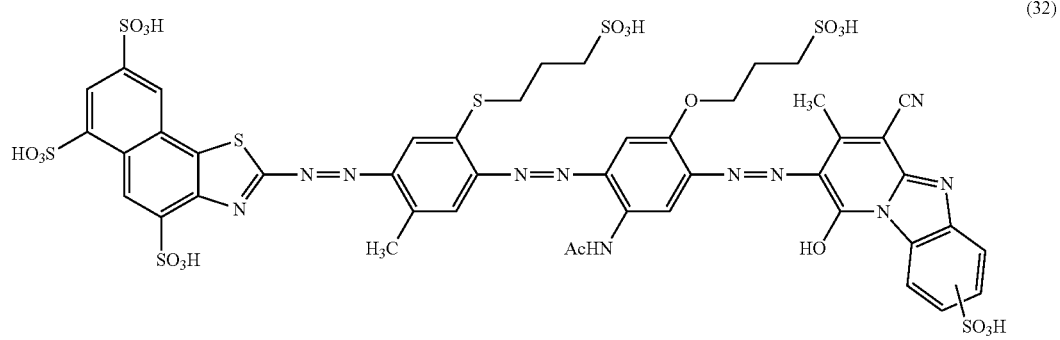

(32)

Example 4

(Step 1)

To 70 parts of N-methylpyrrolidone was added 17.6 parts of 4-methoxy-2-nitrophenol while stirring at 10 to 20° C., and 18.3 parts of 1,3-propane sultone was added dropwise while stirring at 70 to 80° C. over about 30 min. After the reaction was allowed at 110 to 120° C. for 1 hour, the reaction liquid was cooled to 20 to 30° C., and 300 parts of isopropanol was added thereto. Thereafter, the deposited solid was separated by filtration to obtain a wet cake containing a compound represented by the following formula (33). Next, to 170 parts of water were added the obtained wet cake, 1.8 parts of activated charcoal and 0.4 parts of anhydrous ferric chloride. To the mixture was added dropwise 15 parts of 80% hydrazine monohydrate while stirring at 70 to 80° C. over about 30 min. After the dropwise addition, the mixture was stirred at 85 to 95° C. for 3 hrs, and cooled to room temperature. After the insoluble matter was filtered off, acid precipitation was carried out by adding 50% sulfuric acid, and the resulting precipitated matter was separated by filtration to obtain a wet cake containing a compound represented by the following formula (34).

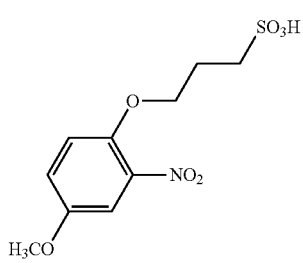

(33)

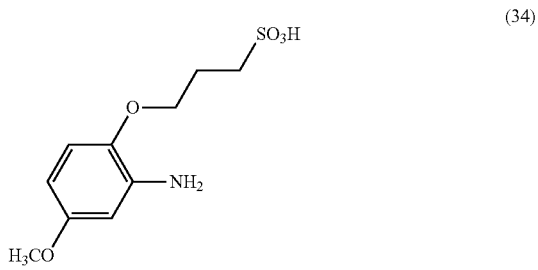

(34)

(Step 2)

In a similar manner to Example 1 except that the wet cake containing the compound represented by the formula (34) obtained in Example 4 (Step 1) was used in place of 5.4 parts of the compound represented by the formula (21) in Example 1 (Step 5), 3.5 parts of a compound represented by the following formula (35) (compound No. 23 in Table 6) of the present invention was obtained in the form of a sodium salt.

λmax: 611.5 nm

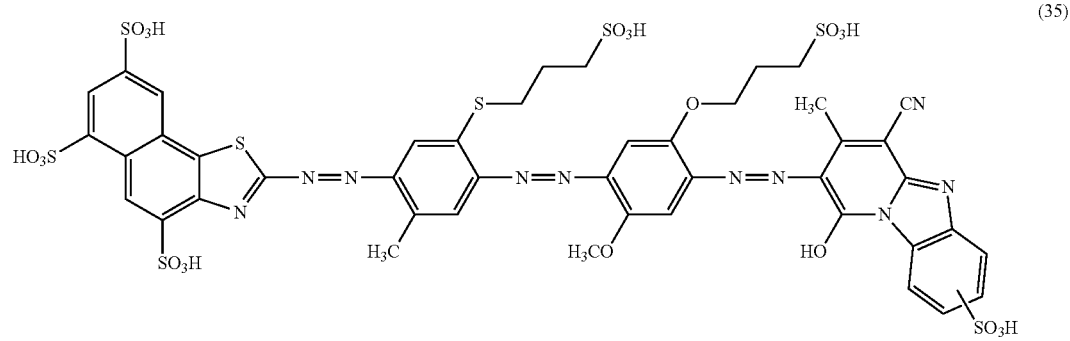

(35)

Example 5

(Step 1)

To 60 parts of N-methylpyrrolidone was added 17.3 parts of 4-chloro-3-nitroaniline, and 12.3 parts of anhydrous acetic acid was added dropwise at 10 to 20° C. while stirring over about 5 min. After the reaction was allowed at the same temperature for 1 hour, the mixture was added dropwise to 70 parts of ice water over about 5 min. The deposited solid was separated by filtration and dried to obtain a compound represented by the following formula (36). To the compound thus obtained were added 22.0 parts of sodium 3-mercaptopropane sulfonate and 60 parts of dimethyl sulfoxide. The mixture was heated to 60° C. while stirring, and 11.2 parts of sodium carbonate was added thereto. After completing the addition, the mixture was heated to 120 to 130° C., and stirred at the same temperature for 6 hrs. After cooling the reaction liquid to room temperature, it was added into 330 parts of 2-propanol. The deposited solid was separated by filtration, and washed with 100 parts of 2-propanol. After thus obtained solid was added to 300 parts of water, the pH value was adjusted to 7.0 to 7.5 with 35% hydrochloric acid. Then, salting-out was carried out by adding sodium chloride, and the precipitated matter was separated by filtration to obtain a wet cake containing a compound represented by the formula (37). To the obtained wet cake were added 170 parts of water, 1.8 parts of activated charcoal and 0.4 parts of anhydrous ferric chloride. To the mixture was added dropwise 15 parts of 80% hydrazine monohydrate while stirring at 70 to 80° C. over about 30 min. After the dropwise addition, the mixture was stirred at 85 to 95° C. for 3 hrs, and cooled to room temperature. After the insoluble matter was filtered off, acid precipitation was carried out by adding 50% sulfuric acid, and the deposited solid was separated by filtration to obtain a wet cake containing a compound represented by the following formula (38).

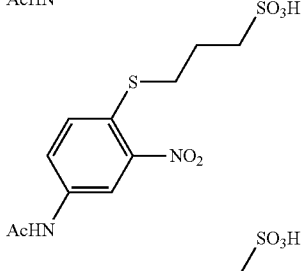

(36)

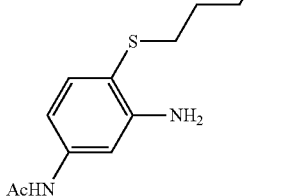

(37)

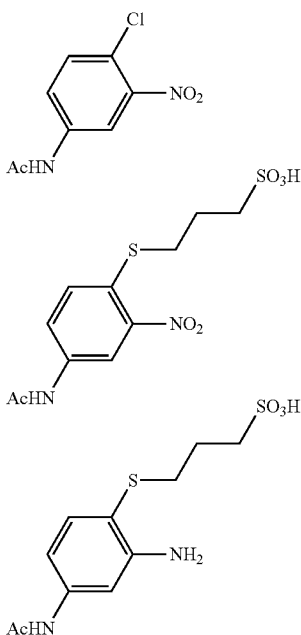

(38)

(Step 2)

In a similar manner to Example 1 except that the aqueous solution containing the compound represented by the formula (38) obtained in Example 5 (Step 1) was used in place of 13.1 parts of the compound represented by the formula (17) in Example 1 (Step 4), 5.3 parts of a compound represented by the following formula (39) (compound No. 2 in Table 2) of the present invention was obtained in the form of a sodium salt. λmax: 593 nm

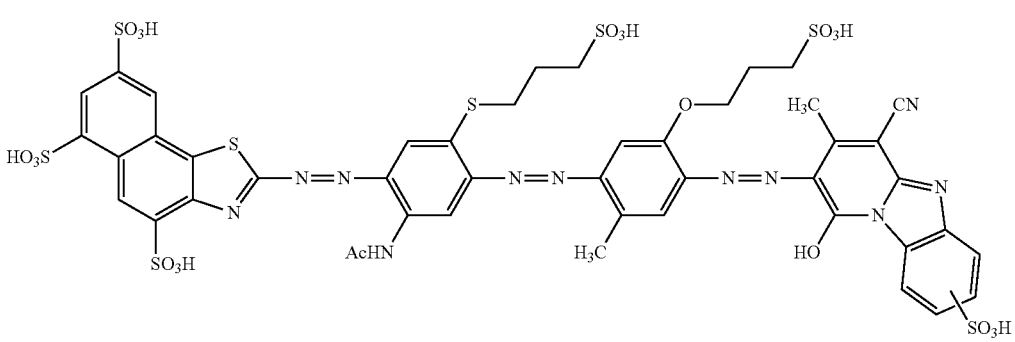

(39)

Example 6

(Step 1)

18.8 parts of 4-chloro-3-nitroanisole, 22.0 parts of sodium 3-mercaptopropane sulfonate and 60 parts of dimethyl sulfoxide were mixed, and the mixture was heated to 60° C. while stirring, to which 11.2 parts of sodium carbonate was added. After completing the addition, the mixture was heated to 120 to 130° C., and stirred at the same temperature for 6 hrs. Thus resulting reaction liquid was cooled to room temperature, and added into 330 parts of 2-propanol while stirring. The deposited solid was separated by filtration, and washed with 100 parts of 2-propanol. After thus obtained solid was added to 300 parts of water, the pH value was adjusted to 7.0 to 7.5 with 35% hydrochloric acid. Then, salting-out was carried out by adding sodium chloride, and the precipitated matter was separated by filtration to obtain a wet cake containing a compound represented by the following formula (40). Next, to the wet cake containing the compound represented by the formula (40) were added 170 parts of water, 1.8 parts of activated charcoal and 0.4 parts of anhydrous ferric chloride. To the mixture was added dropwise 15 parts of 80% hydrazine monohydrate while stirring at 70 to 80° C. over about 30 min. After the dropwise addition, the mixture was stirred at 85 to 95° C. for 3 hrs, and cooled to room temperature. After the insoluble matter was filtered off, acid precipitation was carried out by adding 50% sulfuric acid to the filtrate, and the resulting precipitated matter was separated by filtration to obtain a wet cake containing a compound represented by the following formula (41).

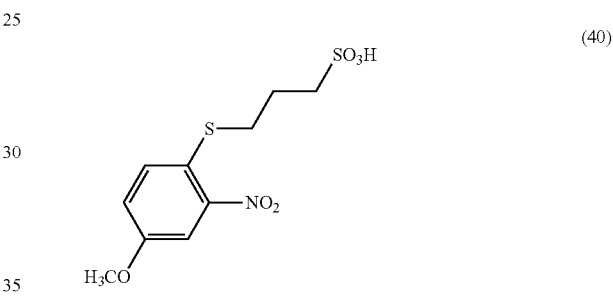

(40)

-continued

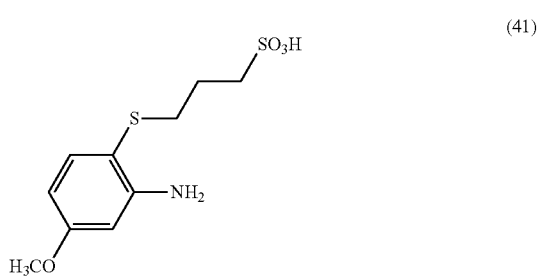

(41)

(Step 2)

In a similar manner to Example 1 except that the aqueous solution containing the compound represented by the formula (41) obtained in Example 6 (Step 1) was used in place of 13.1 parts of the compound represented by the formula (17) in Example 1 (Step 4), 5.7 parts of a compound represented by the following formula (42) (compound No. 4 in Table 2) of the present invention was obtained in the form of a sodium salt.
λmax: 603 nm

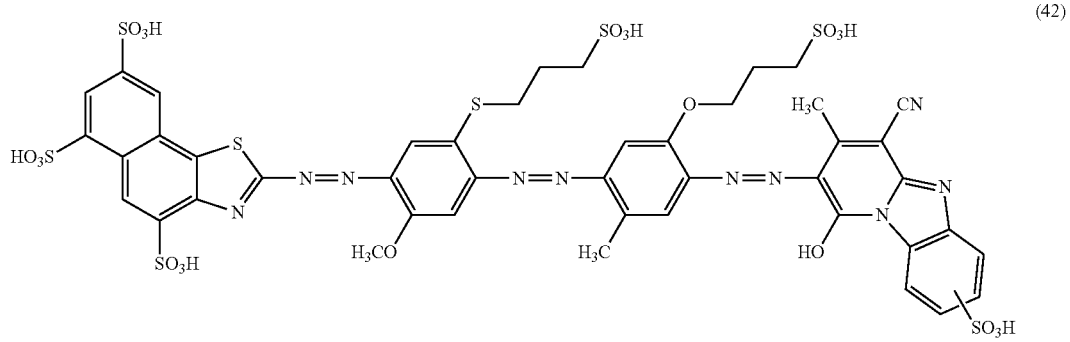

Example 7

(Step 1)

19.2 parts of 2,5-dichloronitrobenzene, 22.0 parts of sodium 3-mercaptopropane sulfonate and 60 parts of dimethyl sulfoxide were mixed, and the mixture was heated to 60° C. while stirring, to which 11.2 parts of sodium carbonate was added. After completing the addition, the mixture was heated to 120 to 130° C., and stirred at the same temperature for 6 hrs. Thus resulting reaction liquid was cooled to room temperature, and added into 330 parts of 2-propanol while stirring. The deposited solid was separated by filtration, and washed with 100 parts of 2-propanol. After thus obtained solid was added to 300 parts of water, the pH value was adjusted to 7.0 to 7.5 with 35% hydrochloric acid. Then, salting-out was carried out by adding sodium chloride, and the precipitated matter was separated by filtration to obtain a wet cake containing a compound represented by the following formula (43). Next, to the wet cake containing the compound represented by the formula (43) were added 170 parts of water, 1.8 parts of activated charcoal and 0.4 parts of anhydrous ferric chloride. To the mixture was added dropwise 15 parts of 80% hydrazine monohydrate while stirring at 70 to 80° C. over about 30 min. After the dropwise addition, the mixture was stirred at 85 to 95° C. for 3 hrs, and cooled to room temperature. After the insoluble matter was filtered off, acid precipitation was carried out by adding 50% sulfuric acid, and the resulting precipitated matter was separated by filtration to obtain a wet cake containing a compound represented by the following formula (44).

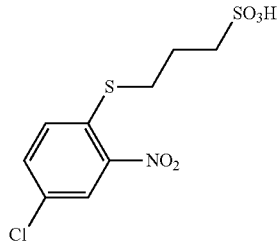

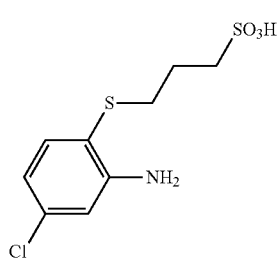

(Step 2)

In a similar manner to Example 1 except that the wet cake containing the compound represented by the formula (44) obtained in Example 7 (Step 1) was used in place of 13.1 parts of the compound represented by the formula (17) in Example 1 (Step 4), 3.4 parts of a compound represented by the following formula (45) (compound No. 26 in Table 7) of the present invention was obtained in the form of a sodium salt.
λmax: 595 nm

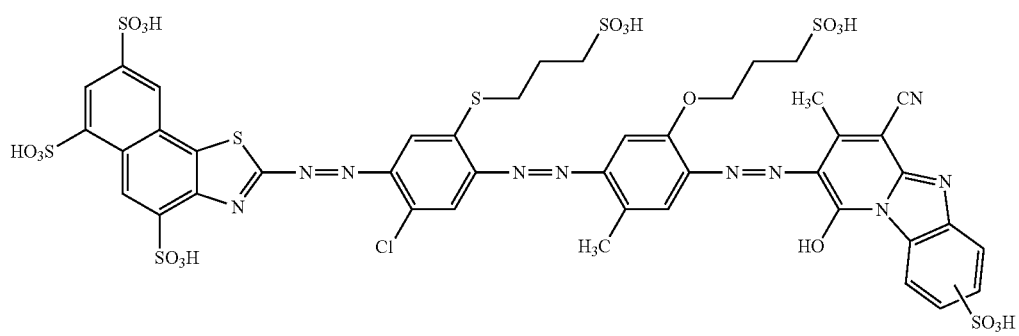

(45)

Example 8

(A) Preparation of Ink

After the ink composition of the present invention having a black color was obtained by mixing each component shown in the following Table 14, contaminants were filtered off using a 0.45 μm membrane filter to obtain an ink. The preparation of this ink is referred to as Example 8.

Water employed was ion exchanged water. In preparing the ink, the pH of the ink was adjusted to 7 to 9 with sodium hydroxide, and the total amount was adjusted to 100 parts by adding ion exchanged water. The aqueous black ink of the present invention did not result in separation by precipitation during storage, and physical properties were unchanged even after storage for a long period of time.

TABLE 14

| | |
|---|---|
| compound obtained in Example 1 | 3.5 parts |
| glycerin | 5.0 parts |
| urea | 5.0 parts |
| N-methyl-2-pyrrolidone | 4.0 parts |
| isopropyl alcohol | 3.0 parts |

TABLE 14-continued

| | |
|---|---|
| butylcarbitol | 2.0 parts |
| surfactant (trade name: Surfinol 104, manufactured by Nissin Chemical Co., Ltd.) | 0.1 parts |
| water + sodium hydroxide | 77.4 parts |
| total | 100.0 parts |

Examples 9 to 11

Inks were prepared in a similar manner to Example 8 except that each compound obtained in Example 5, Example 6, and Example 7 was used in place of the compound obtained in Example 1. The ink prepared using the compound of Example 5 is referred to as Example 9; the ink prepared using the compound of Example 6 is referred to as Example 10; and the ink prepared using the compound of Example 7 is referred to as Example 11. The aqueous black inks of the present invention did not result in separation by precipitation during storage, and physical properties were unchanged even after storage for a long period of time.

Comparative Example 1

An ink for comparison was prepared in a similar manner to Example 8 except that a compound represented by the following formula (46) disclosed in Examples 2 to 6 of Patent Document 8 was used as a comparative control black coloring matter in place of the compound of each Example. The preparation of this ink is referred to as Comparative Example 1.

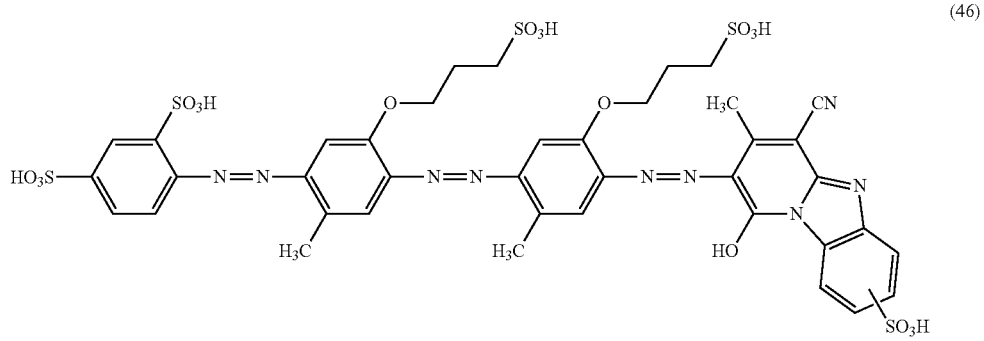

(46)

Comparative Example 2

An ink for comparison was prepared in a similar manner to Example 8 except that a compound represented by the following formula (47) disclosed in Examples 1 to 2 of Patent Document 9 (WO2005/054374) was used as a comparative control black coloring matter in place of the compound of each Example. The preparation of this ink is referred to as Comparative Example 2.

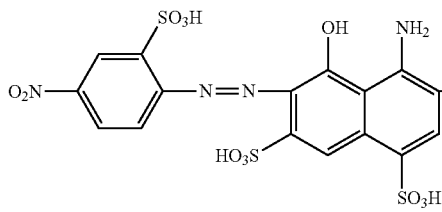
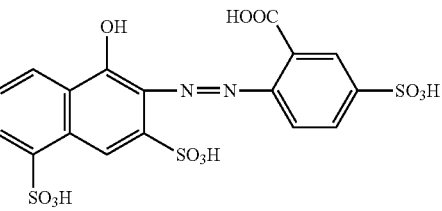

(47)

(B) Ink Jet Printing

Using the inks obtained as described above, ink jet printing was carried out by an ink jet printer PIXUS iP4100 (trade name, manufactured by Canon, Inc.) on three kinds of communication sheets (exclusive ink jet paper) of: glossy paper 1 (manufactured by FUJIFILM Corporation, trade name: KAS-SAI SHASHIN-SHIAGE Pro WPA430PRO); glossy paper 2 (manufactured by Canon, Inc., trade name: Photo Paper Gold Glossy GL-101 A50); and glossy paper 3 (manufactured by Brother Industries, Ltd., Glossy Photo Paper BP61GLA). Upon the printing, an image pattern was produced such that the reflected density was obtained in several-step gradation, whereby a dark black to faint black printed matter was obtained.

(C) Evaluation of Recorded Image

Alteration of density of the image before and after the test in connection with each of the light resistance or the ozone gas resistance was evaluated on each printed image obtained using inks of Examples 9 to 11, and Comparative Examples 1 to 2. Each printed image used had been dried at room temperature for 24 hrs or longer after printing.

The alteration of density of the printed image was determined with a spectrophotometer, SpectroEye (trade name, manufactured by Gretag Macbeth Co.,) by colorimetry on a gradation portion having a black reflected density (Dk value) of the printed image falling within the range of 1.2 to 1.8 before the test. In the determination of the black reflected density Dk value, DIN was used as a density standard, and setting of the viewing angle was 2°.

The tests were performed on each of the glossy papers 1 to 3, and the test results are shown in Table 15.

Specific test methods are as in the following.

1) Ozone Gas Resistance Test

Each printed image was left to stand under a condition of: an ozone concentration of 40 ppm; a humidity of 60% RH; and a temperature of 24° C., using an Ozone Weather Meter (trade name, manufactured by Suga Test Instruments Co., Ltd.) for 8 hrs. With respect to each printed image before and after exposure to ozone, $L^*$, $a^*$ and $b^*$ according to CIE were measured, and the color difference $\Delta E$ was calculated by the following formula. Upon measurement of $L^*$, $a^*$ and $b^*$, D65 was used as a light source, with the setting of the viewing angle of 2°. Note that $\Delta L^*$, $\Delta a^*$ and $\Delta b^*$ in the following formula mean the differences between values of each $L^*$, $a^*$ and $b^*$ before and after the exposure, respectively.

$$\Delta E = (\Delta L^{*2} + \Delta a^{*2} + \Delta b^{*2})^{1/2}$$

Evaluation was made according to the following criteria to give test results. The evaluation results are shown in Table 15 below.

A: $\Delta E$ being less than 15
B: $\Delta E$ being no less than 15 and less than 25
C: $\Delta E$ being no less than 25

2) Light Resistance Test

Using Xenon Weather-Ometer Ci4000 (trade name, manufactured by ATLAS Corporation), each printed image described above was irradiated under a condition of: an irradiance of 0.36 W/m$^2$; a humidity of 60% RH; and a temperature of 24° C. for 168 hrs. During the test, a cover glass was overlaid on the sample surface with a gap of about 1 mm interposed. With respect to each printed image before and after exposure to xenon light, $L^*$, $a^*$ and $b^*$ according to CIE were measured, and the color difference $\Delta E$ was calculated by the following formula. Upon measurement of $L^*$, $a^*$ and $b^*$, D65 was used as a light source, with the setting of the viewing angle of 2°. Note that $\Delta L^*$, $\Delta a^*$ and $\Delta b^*$ in the following formula mean the differences between values of each $L^*$, $a^*$ and $b^*$ before and after the exposure, respectively.

$$\Delta E = (\Delta L^{*2} + \Delta a^{*2} + \Delta b^{*2})^{1/2}$$

Evaluation was made according to the following criteria to give test results. The evaluation results are shown in Table 15 below.

A: $\Delta E$ being less than 10
B: $\Delta E$ being no less than 10 and less than 20
C: $\Delta E$ being no less than 20

3) Evaluation of Color Density

A reflected density Dk value as black was measured using the aforementioned colorimetric system on a part where printed with the highest density. The value was evaluated according to the following criteria. The evaluation results are shown in Table 15 below. A greater Dk value is more preferred since a higher print density is indicated.

A: Dk value being no less than 2.1
B: Dk value being less than 2.1 and no less than 1.9
C: Dk value being less than 1.9

4) Evaluation of Chroma Saturation

For the purpose of verifying as to whether the color is approximate to more achromatic black, a chroma saturation $C^*$ value was evaluated on a part in a region having a low printing density, specifically, the region having a Dk value of 1.2 to 1.9. $C^*$ was calculated by the following formula. Upon measurement of $a^*$ and $b^*$, D65 was used as a light source, with the setting of the viewing angle of 2°.

$$C^* = (a^{*2} + b^{*2})^{1/2}$$

Evaluation was made according to the following criteria to give test results. The evaluation results are shown in Table 15 below. In the case of black inks, a smaller C* value, i.e., approximate to zero, is more preferred since it approximates to a more achromatic color.

A: C* value being less than 45

B: C* value being no less than 45 and less than 55

C: C* value being no less than 55

TABLE 15

|  | ozone gas resistance | light resistance | color density | chroma saturation |
|---|---|---|---|---|
| Example 8 [formula (25)] | | | | |
| glossy paper 1 | A | A | A | A |
| glossy paper 2 | A | A | A | A |
| glossy paper 3 | A | A | A | A |
| Example 9 [formula (40)] | | | | |
| glossy paper 1 | A | A | A | A |
| glossy paper 2 | A | A | A | A |
| glossy paper 3 | A | A | A | A |
| Example 10 [formula (43)] | | | | |
| glossy paper 1 | A | A | A | A |
| glossy paper 2 | A | A | A | A |
| glossy paper 3 | A | A | A | A |
| Example 11 [formula (46)] | | | | |
| glossy paper 1 | A | A | A | A |
| glossy paper 2 | A | A | A | A |
| glossy paper 3 | A | A | A | A |
| Comparative Example 1 [formula (47)] | | | | |
| glossy paper 1 | A | A | B | C |
| glossy paper 2 | A | A | C | C |
| glossy paper 3 | A | A | C | C |
| Comparative Example 2 [formula (48)] | | | | |
| glossy paper 1 | C | A | A | A |
| glossy paper 2 | C | A | A | A |
| glossy paper 3 | C | A | A | A |

As is clear from the results shown in Table 15, the ink of each Example exhibited significantly superior results for all test items. To the contrary, Comparative Example 1 revealed problems of significantly inferior color density and chroma saturation, suggesting that each Example of the present invention provides printed matter having higher print density, and a black color that is approximate to achromatic.

In addition, Comparative Example 2 revealed a problem of significantly inferior ozone gas resistance, suggesting that each Example of the present invention achieved significantly superior ozone gas resistance in comparison with Comparative Example 2.

From the foregoing results, it is proven that the fastness of the printed image obtained with the ink containing the trisazo compound of the present invention is significantly superior as compared with that of the image obtained using conventional trisazo compounds in Comparative Examples, and in particular, extremely favorable color formation perfromance, hue, and ozone gas resistance as black coloring matters demanded for ink jet printed images are achieved.

INDUSTRIAL APPLICABILITY

The ink composition containing the trisazo compound of the present invention is suitably used as a black ink liquid for ink jet printing and for use in writing tools.

The invention claimed is:

1. A trisazo compound represented by the following formula (1) or a tautomer of the same, or a salt thereof:

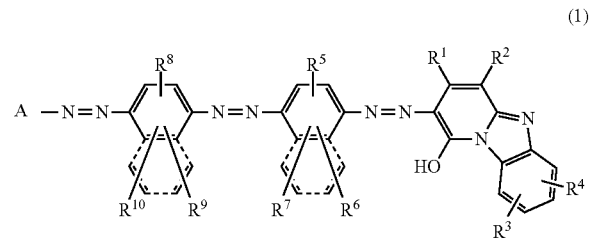

wherein, $R^1$ represents a carboxy group; a C1-C4 alkyl group unsubstituted, or substituted with a carboxy group; or a phenyl group unsubstituted, or substituted with a sulfo group, $R^2$ represents a cyano group; a carbamoyl group; or a carboxy group, $R^3$ and $R^4$ each independently represent a hydrogen atom; a chlorine atom; a sulfo group; an unsubstituted C1-C4 alkyl group; or an unsubstituted C1-C4 alkoxy group, the ring having substitution with $R^5$ to $R^7$ is a benzene ring provided that the ring represented by the dotted line is not present; or a naphthalene ring provided that the ring represented by the dotted line is present, $R^5$ to $R^7$ each independently represent a hydrogen atom; a chlorine atom; a hydroxy group;

a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group or a carboxy group; a mono- or di-C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; or a phenylsulfonylamino group unsubstituted, or substituted with a chlorine atom, an unsubstituted C1-C4 alkyl group, a nitro group, a sulfo group or a carboxy group on the benzene ring, the ring having substitution with $R^8$ to $R^{10}$ is a benzene ring provided that the ring represented by the dotted line is not present; or a naphthalene ring provided that the ring represented by the dotted line is present, $R^8$ to $R^{10}$ each independently represent a hydrogen atom; a chlorine atom; a hydroxy group; a sulfo group; a carboxy group; a sulfamoyl group; a carbamoyl group; an unsubstituted C1-C4 alkyl group; a C1-C4 alkoxy group unsubstituted, or substituted with a hydroxy group, an unsubstituted C1-C4 alkoxy group, a hydroxy C1-C4 alkoxy group, a sulfo group or a carboxy group; a C1-C4 alkylthio group substituted with a hydroxy group, a sulfo group, or a carboxy group; a mono- or di-C1-C4 alkylamino group unsubstituted, or substituted with a hydroxy group, a sulfo group or a carboxy group; a C1-C4 alkylcarbonylamino group unsubstituted, or substituted with a hydroxy group or a carboxy group; an N'—C1-C4 alkylureide group unsubstituted, or substituted with a hydroxy group, a sulfo group or a carboxy group; a phenylamino group unsubstituted, or substituted with a chlorine atom, an unsubstituted C1-C4 alkyl group, a nitro group, a sulfo group or a carboxy group on the benzene ring; a benzoylamino group unsubstituted, or substituted with a chlorine atom, an unsubstituted C1-C4 alkyl group, a nitro group, a sulfo group or a carboxy group on the benzene ring; or a phenylsulfonylamino group unsubstituted, or substituted with a chlorine atom, an unsubstituted C1-C4 alkyl group, a nitro group, a sulfo group or a carboxy group on the benzene ring, and the group A is a 2-naphthothiazolyl group unsubstituted or having a substituent, provided that the 2-naphthothiazolyl group has a substituent, the substituent may be selected from the group consisting of: a chlorine atom; a sulfo group; a nitro group; a hydroxy group; a sulfamoyl group; an unsubstituted C1-C4 alkyl group; a C1-C4 alkoxy group unsubstituted, or substituted with a hydroxy group, a C1-C4 alkoxy group, a sulfo group or a carboxy group; a C1-C4 alkylsulfonyl group unsubstituted, or substituted with a hydroxy group, a sulfo group or a carboxy group; and a phenylsulfonyl group unsubstituted, or substituted with a chlorine atom, an unsubstituted C1-C4 alkyl group, a nitro group, a sulfo group or a carboxy group on the benzene ring.

2. The trisazo compound or a tautomer of the same, or a salt thereof according to claim 1, wherein the trisazo compound represented by the above formula (1) is represented by the following formula (2):

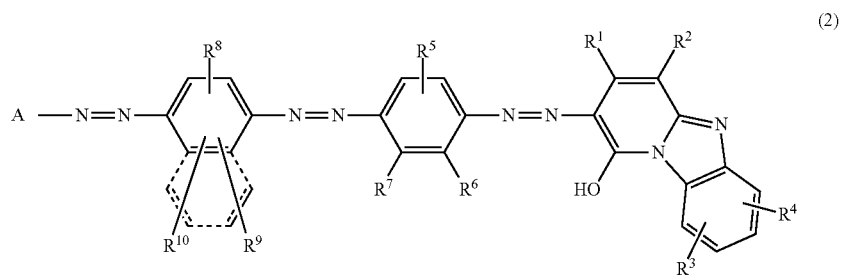

(2)

wherein, the group A, $R^1$ to $R^{10}$, and the ring having substitution with $R^8$ to $R^{10}$ have the same meanings as those in the formula (1) including the ring represented by the dotted line.

3. The trisazo compound or a tautomer of the same, or a salt thereof according to claim 2, wherein the trisazo compound represented by the above formula (1) is represented by the following formula (3):

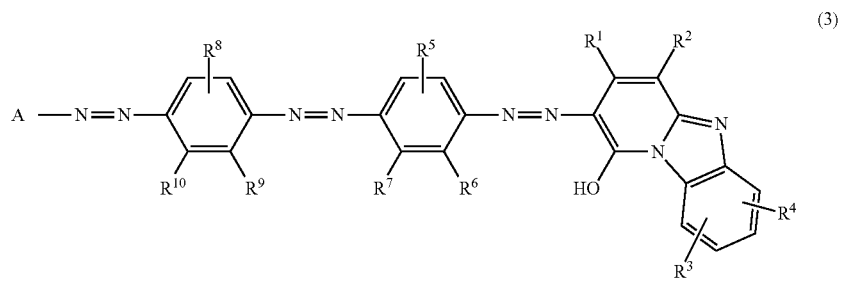

(3)

wherein, the group A, and $R^1$ to $R^{10}$ have the same meanings as those in the formula (1).

4. The trisazo compound or a tautomer of the same, or a salt thereof according to claim 3, wherein the trisazo compound represented by the above formula (1) is represented by the following formula (4):

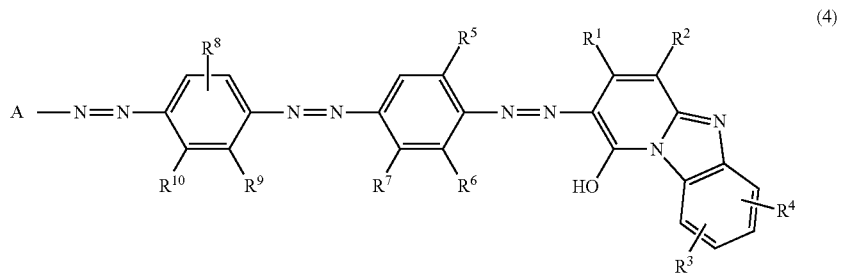

(4)

wherein,
the group A, $R^1$ to $R^4$, and $R^8$ to $R^{10}$ have the same meanings as those in the formula (1),
$R^5$ and $R^7$ each independently represent a hydrogen atom; a chlorine atom; a C1-C4 alkylcarbonylamino group unsubstituted, or substituted with a hydroxy group or a carboxy group; an unsubstituted C1-C4 alkyl group; or a C1-C4 alkoxy group unsubstituted, or substituted with a sulfo group or a hydroxy group, and $R^6$ represents a hydrogen atom.

5. The trisazo compound or a tautomer of the same, or a salt thereof according to claim 4, wherein the trisazo compound represented by the above formula (1) is represented by the following formula (5):

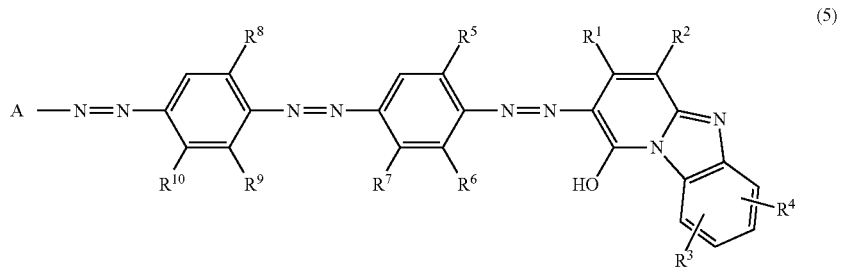

(5)

wherein,
the group A, and $R^1$ to $R^4$ have the same meanings as those in the formula (1),
$R^5$ to $R^7$ have the same meanings as those in the formula (4),
$R^8$ and $R^{10}$ each independently represent a hydrogen atom; a chlorine atom; a C1-C4 alkylcarbonylamino group unsubstituted, or substituted with a hydroxy group or a carboxy group; a sulfo C1-C4 alkoxy group; an unsubstituted C1-C4 alkyl group; a C1-C4 alkoxy group unsubstituted, or substituted with a sulfo group; or a C1-C4 alkylthio group substituted with a sulfo group or a carboxy group, and $R^9$ represents a hydrogen atom.

6. The trisazo compound or a tautomer of the same, or a salt thereof according to claim 1, wherein the group A is a group represented by the following formula (6):

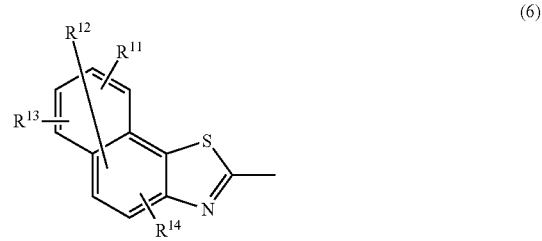

(6)

wherein,
$R^{11}$ to $R^{14}$ each independently represent a group selected from the group consisting of a hydrogen atom; a chlorine atom; a sulfo group; a nitro group; a hydroxy group; a sulfamoyl group; a C1-C4 alkoxy group unsubstituted, or substituted with a hydroxy group, an unsubstituted C1-C4 alkoxy group, a sulfo group or a carboxy group; and a C1-C4 alkylsulfonyl group unsubstituted, or substituted with a hydroxy group, a sulfo group or a carboxy group.

7. The trisazo compound or a tautomer of the same, or a salt thereof according to claim 1, wherein: $R^1$ is a methyl group; $R^2$ is a cyano group or a carbamoyl group; $R^3$ is a hydrogen atom; and $R^4$ is a sulfo group.

8. The trisazo compound or a tautomer of the same, or a salt thereof according to claim 1, wherein: $R^5$ is a sulfopropoxy group or a sulfobutoxy group; $R^6$ is a hydrogen atom; and $R^7$ is a hydrogen atom, a chlorine atom, an acetylamino group, a methyl group or an ethyl group, a methoxy group or an ethoxy group, or a sulfopropoxy group or a sulfobutoxy group.

9. The trisazo compound or a tautomer of the same, or a salt thereof according to claim 1, wherein: $R^8$ is a sulfopropylthio group or sulfobutylthio group; $R^9$ is a hydrogen atom; and $R^{10}$ is a hydrogen atom, a chlorine atom, an acetylamino group, a methyl group or an ethyl group, a methoxy group or an ethoxy group, or a sulfopropoxy group.

10. The trisazo compound or a tautomer of the same, or a salt thereof according to claim 6, wherein: $R^1$ is a methyl group; $R^2$ is a cyano group; $R^3$ is a hydrogen atom; $R^4$ is a sulfo group; $R^5$ is a sulfopropoxy group; $R^6$ is a hydrogen atom; $R^7$ is a methyl group, a methoxy group, a chlorine atom or an acetylamino group; $R^8$ is a sulfopropylthio group; $R^9$ is a hydrogen atom; $R^{10}$ is a methyl group, a methoxy group, a chlorine atom or an acetylamino group; and three among $R^{11}$ to $R^{14}$ are a sulfo group, and the remaining one thereof is a hydrogen atom.

11. An ink composition comprising as a coloring matter at least one of the trisazo compound or a tautomer of the same, or a salt thereof according claim 1.

12. An ink jet printing method comprising printing using as an ink the ink composition according to claim 11 by discharging ink droplets of the ink in response to recording signals to attach on a record-receiving material.

13. The ink jet printing method according to claim 12, wherein the record-receiving material in the ink jet printing method is a communication sheet.

14. The ink jet printing method according to claim 13, wherein the communication sheet is a sheet having an ink-receiving layer comprising a porous white inorganic substance.

15. An ink jet printer equipped with a vessel containing the ink composition according to claim 11.

16. A colored body which was colored with the trisazo compound or a tautomer of the same, or a salt thereof according to claim 1.

* * * * *